US012626929B2

(12) United States Patent  (10) Patent No.: US 12,626,929 B2
Sbriglia et al.  (45) Date of Patent: May 12, 2026

(54) ULTRA-HIGH MOLECULAR WEIGHT POLYETHYLENE (UHMWPE) PARTICLES AND FILLED ARTICLES PRODUCED THEREWITH

(71) Applicants: W. L. Gore & Associates, Inc., Newark, DE (US); W. L. Gore & Associates G.K., Tokyo (JP)

(72) Inventors: Guy A. Sbriglia, Christiana, PA (US); Jeffrey A. Knopf, Wilmington, DE (US); Mark D. Edmundson, Rancho Palos Verdes, CA (US); Shunsuke Takaki, Okayama (JP); Shailesh P. Vidhate, Malvern, PA (US); Ryuta Yamamoto, Okayama (JP); Joseph W. Henderson, Elkton, MD (US)

(73) Assignees: W. L. Gore & Associates, Inc., Newark, DE (US); W. L. Gore & Associates G.K., Tokyo (JP)

( * ) Notice: Subject to any disclaimer, the term of this patent is extended or adjusted under 35 U.S.C. 154(b) by 0 days.

(21) Appl. No.: 19/192,711

(22) Filed: Apr. 29, 2025

(65) Prior Publication Data

US 2025/0266460 A1    Aug. 21, 2025

Related U.S. Application Data

(63) Continuation of application No. 19/099,410, filed as application No. PCT/US2023/071928 on Aug. 9, 2023.

(60) Provisional application No. 63/396,402, filed on Aug. 9, 2022, provisional application No. 63/396,407, filed on Aug. 9, 2022.

(51) Int. Cl.
| | |
|---|---|
| *C08F 10/02* | (2006.01) |
| *H01M 4/04* | (2006.01) |
| *H01M 4/62* | (2006.01) |

(52) U.S. Cl.
CPC ............. *H01M 4/622* (2013.01); *C08F 10/02* (2013.01); *H01M 4/0435* (2013.01)

(58) Field of Classification Search
CPC .......... C08J 5/18; C08J 2323/04; C08F 10/02; B29C 55/005; B29C 55/12
USPC ....................................................... 264/105
See application file for complete search history.

(56) References Cited

U.S. PATENT DOCUMENTS

| | | |
|---|---|---|
| 4,175,055 A | 11/1979 | Goller et al. |
| 4,337,140 A | 6/1982 | Solomon |
| 4,405,544 A | 9/1983 | Solomon |
| 4,556,618 A | 12/1985 | Shia |
| 4,808,493 A | 2/1989 | Breault |
| 4,851,377 A | 7/1989 | Breault |
| 5,100,747 A | 3/1992 | Hayashida et al. |
| 5,162,178 A | 11/1992 | Ohsawa et al. |
| 5,393,617 A | 2/1995 | Klein |
| 5,702,839 A | 12/1997 | Frost et al. |
| 5,707,763 A | 1/1998 | Shimizu et al. |
| 5,871,860 A | 2/1999 | Frost et al. |
| 6,127,474 A | 10/2000 | Andelman |
| 6,171,723 B1 | 1/2001 | Loch et al. |
| 7,090,946 B2 | 8/2006 | Mitchell et al. |
| 7,102,877 B2 | 9/2006 | Mitchell et al. |
| 7,147,674 B1 | 12/2006 | Zhong et al. |
| 7,227,737 B2 | 6/2007 | Mitchell et al. |
| 7,245,478 B2 | 7/2007 | Zhong et al. |
| 7,295,423 B1 | 11/2007 | Mitchell et al. |
| 7,307,830 B2 | 12/2007 | Gallay et al. |
| 7,317,609 B2 | 1/2008 | Zhong et al. |
| 7,342,770 B2 | 3/2008 | Mitchell et al. |
| 7,352,558 B2 | 4/2008 | Zhong et al. |
| 7,384,433 B2 | 6/2008 | Mitchell et al. |
| 7,440,258 B2 | 10/2008 | Thrap et al. |
| 7,492,571 B2 | 2/2009 | Zhong et al. |
| 7,492,574 B2 | 2/2009 | Fresard et al. |
| 7,495,349 B2 | 2/2009 | Mitchell et al. |
| 7,508,651 B2 | 3/2009 | Mitchell et al. |
| 7,532,455 B2 | 5/2009 | Mitchell |

(Continued)

FOREIGN PATENT DOCUMENTS

| | | |
|---|---|---|
| CN | 109575330 A | 4/2019 |
| CN | 109841796 A | 6/2019 |

(Continued)

OTHER PUBLICATIONS

US 7,359,179 B2, 04/2008, Thrap et al. (withdrawn)
English Translation of WO 2018/050314 (Year: 2018).*
International Search Report and Written Opinion received for PCT Patent Application No. PCT/US2025/015469, mailed on Aug. 5, 2025, 17 pages.
International Search Report and Written Opinion received for PCT Patent Application No. PCT/US23/71928, mailed on Jan. 8, 2024, 23 pages.
Invitation to Pay Additional Fees received for PCT Patent Application No. PCT/US23/71928, mailed on Nov. 16, 2023, 17 pages.
Liu et al, "Heterogeneous Distribution of Entanglements in a Nonequilibrium Polymer Melt of UHMWPE: Influence on Crystallization without and with Graphene Oxide," Macromolecules, vol. 49, No. 19, Sep. 26, 2016, pp. 7497-7509.

(Continued)

*Primary Examiner* — Hannah J Pak

(57) ABSTRACT

Apparatuses, systems, materials, and methods for preparing polyethylene electrodes for use in energy storage and transfer via dry electrode processing is described herein. Ultra-high molecular weight polyethylene (UHMWPE) particles and filler particles are used to form a blended composition. With shear, the UHMWPE fibrillates to durably enmesh the filler particles. The blended composition with the fibrillated UHMWPE particles may, in turn, be used to form an article, such as an electrode. The blended composition may contain less than 10% by weight of the UHMWPE. The UHMWPE has a molecular weight of at least about 2,000,000 g/mol, a bulk density from about 0.04 g/mL to about 0.25 g/mL, and a melt enthalpy of at least 190 J/g. In some embodiments, the UHMWPE may be conditioned to alter the size and/or shape of the particles. The median diameter of the conditioned UHMWPE particles is from 5 microns to 300 microns.

7 Claims, 10 Drawing Sheets

(56) References Cited

U.S. PATENT DOCUMENTS

| | | | |
|---|---|---|---|
| 7,722,686 | B2 | 5/2010 | Xi et al. |
| 7,791,860 | B2 | 9/2010 | Mitchell et al. |
| 7,791,861 | B2 | 9/2010 | Zhong et al. |
| 7,811,337 | B2 | 10/2010 | Zhong et al. |
| 7,851,238 | B2 | 12/2010 | Mitchell et al. |
| 7,854,870 | B2 | 12/2010 | Harding et al. |
| 7,859,826 | B2 | 12/2010 | Thrap et al. |
| 7,883,553 | B2 | 2/2011 | Mitchell et al. |
| 7,920,371 | B2 | 4/2011 | Mitchell et al. |
| 7,935,155 | B2 | 5/2011 | Mitchell et al. |
| 8,002,921 | B2 | 8/2011 | Gadkaree et al. |
| 8,072,734 | B2 | 12/2011 | Zhong et al. |
| 8,098,481 | B2 | 1/2012 | Zong et al. |
| 8,213,156 | B2 | 7/2012 | Mitchell et al. |
| 8,279,580 | B2 | 10/2012 | Zhong et al. |
| 8,591,601 | B2 | 11/2013 | Zhong et al. |
| 8,815,443 | B2 | 8/2014 | Mitchell et al. |
| 8,883,348 | B2 | 11/2014 | Nishino et al. |
| 9,181,359 | B2 | 11/2015 | Nishino et al. |
| 9,251,969 | B2 | 2/2016 | Dandrea |
| 9,397,338 | B2 | 7/2016 | Park et al. |
| 9,472,354 | B2 | 10/2016 | Do et al. |
| 9,525,168 | B2 | 12/2016 | Mitchell et al. |
| 9,583,757 | B2 | 2/2017 | Park et al. |
| 9,679,703 | B2 | 6/2017 | Bendale et al. |
| 9,715,970 | B2 | 7/2017 | Bendale et al. |
| 9,728,342 | B2 | 8/2017 | Bendale et al. |
| 9,768,466 | B2 | 9/2017 | Brckner et al. |
| 9,806,328 | B2 | 10/2017 | Park et al. |
| 9,926,416 | B2 | 3/2018 | Sbriglia |
| 9,987,773 | B2 | 6/2018 | Sbriglia et al. |
| 9,997,765 | B2 | 6/2018 | Park et al. |
| 10,043,615 | B2 | 8/2018 | Bendale et al. |
| 10,062,900 | B2 | 8/2018 | Bruckner et al. |
| 10,069,131 | B2 | 9/2018 | Zhong |
| 10,096,432 | B2 | 10/2018 | Mitchell et al. |
| 10,153,096 | B2 | 12/2018 | Xi et al. |
| 10,199,633 | B2 | 2/2019 | Rios et al. |
| 10,249,448 | B2 | 4/2019 | Bendale et al. |
| 10,249,449 | B2 | 4/2019 | Raman et al. |
| 10,388,943 | B2 | 8/2019 | Bonhomme et al. |
| 10,431,807 | B2 | 10/2019 | Suzuki et al. |
| 10,431,808 | B2 | 10/2019 | Park et al. |
| 10,439,202 | B2 | 10/2019 | Glock et al. |
| 10,461,319 | B2 | 10/2019 | Duong et al. |
| 10,497,962 | B2 | 12/2019 | Glanz et al. |
| 10,516,155 | B2 | 12/2019 | Park et al. |
| 10,547,045 | B2 | 1/2020 | Hong et al. |
| 10,547,057 | B2 | 1/2020 | Mitchell et al. |
| 10,596,547 | B2 | 3/2020 | Stabler et al. |
| 10,600,581 | B2 | 3/2020 | Feaver et al. |
| 10,658,652 | B2 | 5/2020 | Komura et al. |
| 10,707,027 | B2 | 7/2020 | Xi et al. |
| 10,707,492 | B2 | 7/2020 | Amin-Sanayei et al. |
| 10,741,843 | B2 | 8/2020 | Duong et al. |
| 10,763,051 | B2 | 9/2020 | Bendale et al. |
| 10,818,441 | B2 | 10/2020 | Mitchell et al. |
| 10,840,540 | B2 | 11/2020 | Duong et al. |
| 10,847,780 | B2 | 11/2020 | Jiang et al. |
| 10,892,490 | B2 | 1/2021 | Stabler et al. |
| 10,923,295 | B2 | 2/2021 | Raman et al. |
| 10,923,707 | B2 | 2/2021 | Zheng et al. |
| 10,985,361 | B2 | 4/2021 | Bonhomme et al. |
| 11,011,737 | B2 | 5/2021 | Eskra et al. |
| 11,050,121 | B2 | 6/2021 | Eskra et al. |
| 2004/0006170 | A1* | 1/2004 | Haftka .................... C08L 21/00 524/515 |
| 2005/0057888 | A1 | 3/2005 | Mitchell et al. |
| 2008/0206446 | A1 | 8/2008 | Mitchell et al. |
| 2011/0124835 | A1 | 5/2011 | De et al. |
| 2011/0204284 | A1 | 8/2011 | Duncan et al. |
| 2013/0209805 | A1 | 8/2013 | Nishino et al. |
| 2014/0210129 | A1 | 7/2014 | Okafor et al. |
| 2015/0061176 | A1 | 3/2015 | Bruckner et al. |
| 2016/0226097 | A1 | 8/2016 | Wegner et al. |
| 2016/0297937 | A1 | 10/2016 | Sbriglia |
| 2017/0256782 | A1 | 9/2017 | Raman et al. |
| 2018/0062155 | A1 | 3/2018 | Mitchell et al. |
| 2018/0104670 | A1 | 4/2018 | Stabler et al. |
| 2018/0277847 | A1 | 9/2018 | Saidi |
| 2019/0131613 | A1 | 5/2019 | Mitchell |
| 2019/0131626 | A1 | 5/2019 | Wang et al. |
| 2019/0139714 | A1 | 5/2019 | Shin et al. |
| 2019/0157722 | A1 | 5/2019 | Shin et al. |
| 2019/0190011 | A1 | 6/2019 | Hao et al. |
| 2019/0211478 | A1 | 7/2019 | Ou et al. |
| 2019/0237748 | A1 | 8/2019 | Shin et al. |
| 2019/0280289 | A1 | 9/2019 | Zhang et al. |
| 2019/0305316 | A1 | 10/2019 | Wang et al. |
| 2019/0318882 | A1 | 10/2019 | Cao et al. |
| 2019/0362909 | A1 | 11/2019 | Raman et al. |
| 2020/0044257 | A1 | 2/2020 | Koo et al. |
| 2020/0152967 | A1 | 5/2020 | Duong et al. |
| 2020/0152968 | A1 | 5/2020 | Saidi |
| 2020/0152987 | A1 | 5/2020 | Mitchell et al. |
| 2020/0176759 | A1 | 6/2020 | Duong et al. |
| 2020/0220151 | A1 | 7/2020 | Reinsch et al. |
| 2020/0227722 | A1 | 7/2020 | Bogenstahl et al. |
| 2020/0227723 | A1 | 7/2020 | Wang et al. |
| 2020/0259180 | A1 | 8/2020 | Shin et al. |
| 2020/0313175 | A1 | 10/2020 | Shin et al. |
| 2020/0313193 | A1 | 10/2020 | Shin et al. |
| 2020/0321599 | A1 | 10/2020 | Kim et al. |
| 2020/0358100 | A1 | 11/2020 | Duong et al. |
| 2020/0388822 | A1 | 12/2020 | Zhong et al. |
| 2021/0013487 | A1 | 1/2021 | Koo et al. |
| 2021/0074992 | A1 | 3/2021 | Jiang et al. |
| 2021/0075055 | A1 | 3/2021 | Duong et al. |
| 2021/0090820 | A1 | 3/2021 | Rajendran et al. |
| 2021/0098770 | A1 | 4/2021 | Yudi et al. |
| 2021/0111432 | A1 | 4/2021 | Saidi et al. |
| 2021/0155766 | A1 | 5/2021 | Zhang et al. |
| 2021/0193398 | A1 | 6/2021 | Raman et al. |
| 2021/0234173 | A1 | 7/2021 | Wang et al. |
| 2021/0249657 | A1 | 8/2021 | Shin et al. |
| 2021/0273290 | A1 | 9/2021 | Bauer et al. |
| 2021/0320288 | A1 | 10/2021 | Althues et al. |

FOREIGN PATENT DOCUMENTS

| | | |
|---|---|---|
| EP | 0359557 A2 | 3/1990 |
| EP | 2820699 A1 | 1/2015 |
| EP | 2896085 A1 | 7/2015 |
| EP | 3263637 A1 | 1/2018 |
| EP | 3285906 A1 | 2/2018 |
| EP | 3508623 A1 | 7/2019 |
| EP | 3513417 A1 | 7/2019 |
| EP | 3595052 A2 | 1/2020 |
| EP | 3607570 A1 | 2/2020 |
| EP | 3609000 A1 | 2/2020 |
| EP | 3625018 A1 | 3/2020 |
| EP | 3642894 A1 | 4/2020 |
| EP | 3642895 A1 | 4/2020 |
| EP | 3811442 A1 | 4/2021 |
| GB | 2356830 A | 6/2001 |
| WO | 92/01830 A1 | 2/1992 |
| WO | 2007/062126 A1 | 5/2007 |
| WO | 2007/062143 A2 | 5/2007 |
| WO | 2008/127790 A1 | 10/2008 |
| WO | 2010/006179 A2 | 1/2010 |
| WO | 2010/011509 A1 | 1/2010 |
| WO | 2012/053261 A1 | 4/2012 |
| WO | 2014/041108 A1 | 3/2014 |
| WO | 2017/149044 A1 | 9/2017 |
| WO | 2018/050314 A1 | 3/2018 |
| WO | 2018/050552 A1 | 3/2018 |
| WO | 2018/210723 A1 | 11/2018 |
| WO | 2019/025336 A1 | 2/2019 |
| WO | 2020/097327 A2 | 5/2020 |
| WO | 2020/148410 A2 | 7/2020 |
| WO | 2020/150254 A1 | 7/2020 |

(56)          References Cited

FOREIGN PATENT DOCUMENTS

| WO | 2021/028619 A1 | 2/2021 |
| WO | 2024/036210 A1 | 2/2024 |

OTHER PUBLICATIONS

Liu et al, "Unique Rheological Response of Ultrahigh Molecular Weight Polyethylenes in the Presence of Reduced Graphene Oxide," Macromolecules, vol. 48, No. 1, Jan. 13, 2015, pp. 131-139.
Bashir et al., "Production of oriented polyacrylonitrile films by flow-induced chain extension and crystallization from solution", Journal of Materials Science, vol. 28, No. 1, 1993, pp. 2721-2732.
Bashir et al., "The Explanation of the Increase in Slope at the Tg in the Plot of d-Spacing Versus Temperature in Polyacrylonitrile", Journal of Macromolecular Science, Part B: Physics, vol. 44, No. 1, 2005, pp. 55-78.

Bashir, "Polycrylonitrile, an unusual linear homopolymer with two glass transitions", Indian Journal of Fibre & Textile Research, vol. 24, No. 1, 1999, pp. 1-9.
Bashir, "The Hexagonal Mesophase in Atactic Polyacrylonitrile: A New Interpretation of the Phase Transitions in the Polymer", Journal of Macromolecular Science, vol. 40, No. 1, 2001, pp. 41-67.
Bashir, "Thermoreversi ble Gels of Polyacrylonitrile", Journal of Polymer Science, vol. 30, No. 1, 1992, pp. 1299-1304.
Bashir, "Thermoreversible gelation and plasticization of polyacrylonitrile", Polymer, vol. 33, No. 20, 1992, pp. 1-10.
Peebles, "Polyacrylonitrile Prepared in Ethylene Carbonate Solution. 111. Molecular Parameters", Journal of Polymer Science: Part A, vol. 3, No. 1, 1965, pp. 361-368.
Yang, et al., "Dry-processable polymer electrolytes for solid manufactured batteries," ACS Nano 2023 17 (20), 19903-19913, DOI: 10.1021/acsnano.3c04610.

* cited by examiner

ULTRA-HIGH MOLECULAR WEIGHT POLYETHYLENE (UHMWPE) PARTICLES AND FILLED ARTICLES PRODUCED THEREWITH

FIELD

The present disclosure relates generally to solvent-free processing, and more particularly, to apparatuses, systems, materials, and methods for preparing polyethylene ("PE") electrodes for use in energy storage and transfer via dry electrode processing.

BACKGROUND

Electrical energy storage is important in many applications, including mobile electronic devices, electric vehicles, and solar energy capture. As new applications in which electrical energy storage are used and as technologies are shifting toward use of electrical power, various factors have driven the development of electrochemical energy storage devices. For example, some considerations include the cost and efficiency of manufacturing electrochemical energy storage devices, the size and weight of electrochemical energy storage devices, the environmental impact of manufacturing and disposal of electrochemical energy devices, and the efficiency and durability of electrochemical energy storage device over time. The dominant electrochemical energy storage technology for many applications is lithium-ion batteries.

The incumbent methodology used to produce most commercial lithium-ion battery electrodes, sometimes called the "wet process," involves the use of large quantities of liquid processing aids (e.g., solvents such as N-methyl-2-pyrrolidone (NMP)) that may be hazardous to people and/or the environment as well as the use of large ovens to remove the liquid processing aids. Other methods for producing lithium-ion battery electrodes have been in development including a "dry electrode process" that does not require liquid processing aids or large ovens. Initial development of the dry electrode process focused on electrodes for supercapacitors. More recently, there has been a substantial increase in interest in applying the dry electrode process to other electrodes, such as those in lithium-ion batteries. Major motivations for switching from the wet process to the dry electrode process are to reduce the cost, physical footprint, and environmental impact of electrode production.

Accordingly, there is a need in the art for more efficient methods of electrode production that have a decreased environmental impact and that are scalable for mass production of articles that may be used in various settings and industries.

SUMMARY

According to one aspect ("Aspect 1") a method of manufacturing an article includes shearing filler particles and UHMWPE particles having a molecular weight of at least 2,000,000 g/mol and a melt enthalpy of at least 190 J/g to form a blended particle composition and forming the blended particle composition into an article, where the filler particles are durably enmeshed within fibrils formed by the UHMWPE particles and where the article is at least 80% by weight filler particles.

According to another aspect ("Aspect 2") further to Aspect 1, including fibrillating the UHMWPE particles prior to shearing the filler particles and the UHMWPE particles.

According to another aspect ("Aspect 3") further to Aspect 1 or Aspect 2, where forming the blended particle composition into an article includes calendering the blended particle composition.

According to another aspect ("Aspect 4") further to any one of Aspects 1 to 3, where the article has DSC curve with a DSC peak between about 143° C. and about 175° C. and where the article has a fibrillation percentage greater than 0%.

According to another aspect ("Aspect 5") further to any one of Aspects 1 to 4, where the particles include at least one of carbon particles, conductive carbon particles, activated carbon particles, graphite particles, carbon black particles, and lithium compound particles.

According to another aspect ("Aspect 6") further to any one of Aspects 1 to 5, including conditioning the UHMWPE particles prior to shearing the filler particles and the UHMWPE particles, where the UHMWPE particles have a median Da from about 5 microns to about 300 microns.

According to another aspect ("Aspect 7") further to any one of Aspects 1 to 6, where the blended particle composition includes less than 10% by weight of the fibrillatable UHMWPE particles.

According to another aspect ("Aspect 8") a composite material includes a filler material including filler particles and a binder system including ultra-high molecular weight polyethylene (UHMWPE) particles having a molecular weight of at least 2,000,000 g/mol and a melt enthalpy of at least 190 J/g, where the filler material and the UHMWPE particles are sheared and formed into an article such that the composite material includes a DSC peak from about 143° C. to about 175° C.

According to another aspect ("Aspect 9") further to Aspect 8, where the composite material has a DSC curve with the DSC peak between about 143° C. and about 175° C., where a fibrillation percentage is determined by an integration of the DSC peak as a percentage of an integration of the DSC curve between about 100° C. and about 175° C., and where the article has a fibrillation percentage greater than 0%.

According to another aspect ("Aspect 10") further to Aspect 8 or Aspect 9, where the filler material is selected from at least one of carbon particles, conductive carbon particles, activated carbon particles, graphite particles, carbon black particles, and lithium compound particles.

According to another aspect ("Aspect 11") further to any one of Aspects 7 to 10, where the binder system includes less than 20% by weight polytetrafluoroethylene.

According to another aspect ("Aspect 12") further to any one of Aspects 7 to 11, where the binder system is free of polytetrafluoroethylene.

According to another aspect ("Aspect 13") a blended particle composition includes filler particles and fibrillatable UHMWPE particles that include a molecular weight of at least about 2,000,000 g/mol, a bulk density from about 0.04 g/mL to about 0.25 g/mL, and a melt enthalpy of at least 190 J/g where the blended particle composition contains therein less than about 10% by weight of the fibrillatable binder particles.

According to another aspect ("Aspect 14") further to Aspect 13, where the blended particle composition contains therein less than about 5% by weight of the fibrillatable binder particles.

According to another aspect ("Aspect 15") further to Aspect 13 or Aspect 14, where the filler material includes at least one of carbon particles, conductive carbon particles, activated carbon particles, graphite particles, carbon black particles, and lithium compound particles.

According to another aspect ("Aspect 16") further to any one of Aspects 13 to 15, where the UHMWPE particles are formed of agglomerations of fine particles, and where the fine particles have an average diameter greater than or equal to 10 nm and less than or equal to 2000 nm.

According to another aspect ("Aspect 17") an article including filler particles and a binder system including fibrillated ultra-high molecular weight polyethylene (UHMWPE) particles where the fibrillated UHMWPE particles have a molecular weight of at least about 2,000,000 g/mol, a median Da from about 5 microns to about 300 microns, and a melt enthalpy of at least 190 J/g, where the article has a DSC peak at about 143° C. to about 175° C., and where the filler particles are durably enmeshed in the fibrils of the fibrillated UHMWPE particles.

According to another aspect ("Aspect 18") further to Aspect 17, where the UHMWPE particles include at least one of a median sphericity from about 0.820 to about 0.880, a median convexity from about 0.950 to about 0.990, and a median length-to-width ratio from about 1.50 to about 1.80.

According to another aspect ("Aspect 19") further to Aspect 17 or Aspect 18, where the article has an endotherm from about 145° C. to about 155° C. that is associated with the fibrillated UHMWPE particles.

According to another aspect ("Aspect 20") further to any one of Aspects 17 to 19, where the article has a DSC curve with a DSC peak between about 143° C. and about 175° C., where a fibrillation percentage is determined by an integration of the DSC peak as a percentage of an integration of the DSC curve between about 100° C. and about 175° C., and where the article has a fibrillation percentage greater than 0%

According to another aspect ("Aspect 21") further to any one of Aspects 17 to 20, where the filler particles are selected from at least one of carbon particles, conductive carbon particles, activated carbon particles, graphite particles, carbon black particles, and lithium compound particles.

According to another aspect ("Aspect 22") further to any one of Aspects 17 to 21, where the binder system includes less than 20% by weight polytetrafluoroethylene.

According to another aspect ("Aspect 23") further to any one of Aspects 17 to 22, where the binder system is free of polytetrafluoroethylene.

According to another aspect ("Aspect 24") further to any one of Aspects 17 to 23, where the article is self-supporting.

According to another aspect ("Aspect 25") further to any one of Aspects 17 to 24, where the fibrillated UHMWPE particles have a median Da from about 5 microns to about 300 microns.

According to another aspect ("Aspect 26") a method of manufacturing an article includes shearing filler particles and UHMWPE particles having a molecular weight of at least about 2,000,000 g/mol, a melt enthalpy of at least 190 J/g, and a bulk density from about 0.04 m/mL to about 0.25 g/mL to form a blended particle composition where the filler particles are durably enmeshed within fibrils formed by the UHMWPE particles and forming the blended particle composition into an article where the article contains at least about 80% by weight filler particles.

According to another aspect ("Aspect 27") further to Aspect 26 where the article has a DSC curve with a DSC peak between about 143° C. and about 175° C., and where the article has a fibrillation percentage greater than 0%.

According to another aspect ("Aspect 28") further to Aspect 26 or Aspect 28 including conditioning the UHMWPE particles prior to shearing the UHMWPE particles such that the UHMWPE particles have a median Da from about 5 microns to about 300 microns, or the UHMWPE particles have a median sphericity from about 0.820 to about 0.880, or the UHMWPE particles have a median convexity from about 0.950 to about 0.990, or the UHMWPE particles have a median length-to-width ratio from about 1.50 to about 1.80.

According to another aspect ("Aspect 29") an electrode includes a filler material, and a binder system including fibrillated UHMWPE particles, where the UHMWPE particles includes a median Da from about 5 microns to about 300 microns, a median sphericity from about 0.820 to about 0.880, a median convexity from about 0.950 to about 0.990, and a median length-to-width ratio from about 1.50 to about 1.80, where the UHMWPE particles have a DSC peak from about 143° C. to about 175° C.

According to another aspect ("Aspect 30") further to Aspect 29, where the filler material is at least 90% by weight of the electrode.

According to another aspect ("Aspect 31") further to Aspect 28 or Aspect 29, where the UHMWPE particles are 10% or less by weight of the electrode.

According to another aspect ("Aspect 32") further to any one of Aspects 29 to 31, where the electrode is self-supporting.

According to another aspect ("Aspect 33") further to any one of Aspects 29 to 32 where the electrode has a DSC curve with a DSC peak between about 143° C. and about 175° C., and where the electrode has a fibrillation percentage greater than 0%.

According to another aspect ("Aspect 34") further to any one of Aspects 29 to 33 where the UHMWPE particles have a median Da from about 5 microns to about 300 microns, or a median sphericity from about 0.820 to about 0.880, or a median convexity from about 0.950 to about 0.990, or a median length-to-width ratio from about 1.50 to about 1.80.

According to another aspect ("Aspect 35") further to any one of Aspects 29 to 34 where the binder system includes less than 20% by weight polytetrafluoroethylene.

According to another aspect ("Aspect 36") further to any one of Aspects 29 to 35 where the binder system is free of polytetrafluoroethylene.

According to another aspect ("Aspect 37") a method of making an electrode includes providing ultra-high molecular weight polyethylene (UHMWPE) particles having a molecular weight of at least about 2,000,000 g/mol, a melt enthalpy of at least 190 J/g, and a bulk density ranging from about 0.04 g/mL to about 0.25 g/mL; providing filler particles selected from at least one of carbon particles, conductive carbon particles, activated carbon particles, graphite particles, carbon black particles, and lithium compound particles; dry blending the UHMWPE particles with the filler particles to produce a dry blended product having therein fibrillated UHMWPE particles; and forming the dry blended product into a composite sheet, where the filler particles are durably enmeshed in the fibrillated UHMWPE particles.

According to another aspect ("Aspect 38") further to Aspect 37, where the composite sheet includes at least 90% by weight of the dry filler particles.

According to another aspect ("Aspect 39") further to Aspect 37 or Aspect 38, the composite sheet includes 10% by weight or less by weight of the fibrillated UHMWPE particles.

According to another aspect ("Aspect 40") further to any one of Aspects 37 to 39, where the composite sheet has a thickness from about 10 microns to about 500 microns.

According to another aspect ("Aspect 41") further to any one of Aspects 37 to 40, where the composite sheet has a tensile stress at a maximum load from about 2,500 kPa to about 7,000 kPa.

According to another aspect ("Aspect 42") further to any one of Aspects 37 to 41, where the composite sheet has a DSC curve with a DSC peak between about 143° C. and about 175° C., and where the composite sheet has a fibrillation percentage greater than 0%.

According to another aspect ("Aspect 43") further to any one of Aspects 37 to 42, where the composite sheet has a tensile strain at maximum load from about 3% to about 9%.

According to another aspect ("Aspect 44") further to any one of Aspects 37 to 43, where the composite sheet has a tensile strain at break from about 5% to about 50%.

According to another aspect ("Aspect 45") further to any one of Aspects 37 to 44, including applying the composite sheet to an electrically conductive substrate.

According to another aspect ("Aspect 46") further to any one of Aspects 37 to 45, where forming the dry blended product into the composite sheet includes one or more of applying pressure, calendering, and applying heat.

According to another aspect ("Aspect 47") further to any one of Aspects 37 to 46, where the filler particles are selected from at least one of carbon particles, conductive carbon particles, activated carbon particles, graphite particles, carbon black particles, and lithium compound particles.

According to another aspect ("Aspect 48") a method of preparing conditioned, fibrillatable ultra-high molecular weight polyethylene (UHMWPE) particles for use in a dry electrode process includes providing ultra-high molecular weight polyethylene (UHMWPE) particles having a molecular weight of at least about 2,000,000 g/mol, a melt enthalpy of at least 190 J/g, and a bulk density from about 0.04 g/mL to about 0.25 g/mL and conditioning the UHMWPE particles by shear mixing the UHMWPE particles to alter size and shape of the UHMWPE particles to have a median Da from about 5 to about 300 microns and a shape having a median length-to-width ratio from about 1.50 to about 1.80, or a median sphericity from about 0.820 to about 0.880, or a median convexity from about 0.950 to about 0.990.

According to another aspect ("Aspect 49") an ultra-high molecular weight polyethylene (UHMWPE) resin includes a molecular weight of at least about 2,000,000 g/mol, a melt enthalpy of at least 190 J/g, a bulk density from about 0.04 g/mL to about 0.25 g/mL, a median Da from about 5 microns to about 300 microns, a median sphericity from about 0.820 to about 0.880 microns, a median convexity from about 0.950 to about 0.990, and a median length-to-width ratio from about 1.50 to about 1.80.

According to another aspect ("Aspect 50") a binder system includes fibrillatable, ultra-high molecular weight polyethylene (UHMWPE) particles having a molecular weight of at least about 2,000,000 g/mol, a melt enthalpy of at least 190 J/g, a median Da from about 5 microns to about 300 microns, a median sphericity from about 0.820 to about 0.880, a median convexity from about 0.950 to about 0.990, and a median length-to-width ratio from about 1.50 to about 1.80.

According to another aspect ("Aspect 51") further to Aspect 49 where the fibrillatable UHMWPE particles are operable to be used in a dry electrode process.

According to another aspect ("Aspect 52") use of ultra-high molecular weight polyethylene (UHMWPE) resin particles as a binder in making an electrode, the UHMWPE particles each having a molecular weight of at least 2,000,000 g/mol, a melt enthalpy of at least 190 J/g, and a bulk density of 0.04 g/mL to 0.25 g/mL.

According to another aspect ("Aspect 53") a composite binder system includes a plurality of filler particles characterized by a filler particle median Da and UHMWPE resin particles having a resin particle median Da, a molecular weight of at least 2,000,000 g/mol, a melt enthalpy of at least 190 J/g, and a bulk density of 0.04 g/mL to 0.25 g/mL where the ratio of the filler particle median Da to the resin particle median Da is from 10:1 to 1:10.

According to another aspect ("Aspect 54") a composite binder system includes filler particles and ultra-high molecular weight polyethylene particles (UHMWPE) where the composite binder system has a force slope of at least 200 N/mm as measured by a capillary rheometer on a test sample under the following conditions:

1. Test sample is a uniform blend of 95 wt % filler particles and 5 wt % UHMWPE resin particles;
2. Barrel diameter of 12 mm and barrel length of 241.3 mm;
3. Maximum test load of 20 kN;
4. Temperature (barrel and die) of 130° C.;
5. Tape die reduction ratio of 2.5;
6. Piston velocity of 1 mm/s; and
7. Measuring normal force versus piston position and calculating the slope of the normal force and piston position line using the following equation; Equation for calculating slope: $m = (y_2 - y_1) \div (x_2 - x_1)$; where, $m$=slope, $(x_1, y_1)$=Coordinates of first point in the line of Force (N) Versus Piston Position (mm), $(x_2, y_2)$ =Coordinates of second point in the line of Force (N) Versus Piston Position (mm); where the test sample is capable of forming a solid extrudate.

According to another aspect ("Aspect 55") a composition includes ultra-high molecular weight polyethylene particles (UHMWPE) having a percent (%) compressibility of at least 20% at 15 kPa normal stress as measured using powder rheometer at 22° C.

According to another aspect ("Aspect 56") a composition includes ultra-high molecular weight polyethylene (UHMWPE) particles having cohesion of at least 3 kPa as measured using a powder rheometer at 22° C.

According to another aspect ("Aspect 57") a composition includes ultra-high molecular weight polyethylene (UHMWPE) particles having unconfined yield stress (UYS) of at least 10 kPa as measured using a powder rheometer at 22° C.

According to another aspect ("Aspect 58") a composition includes ultra-high molecular weight polyethylene (UHMWPE) particles having an angle of internal friction (AIF) of at least 25° as measured using a powder rheometer at 22° C.

According to another aspect ("Aspect 59") a composition includes conditioned ultra-high molecular weight polyethylene (UHMWPE) particles having a percent change of angle of internal friction (AIF) relative to preconditioned UHMWPE particles of at least 50% as measured using powder rheometry at 22° C.

According to another aspect ("Aspect 60") a composition includes conditioned ultra-high molecular weight polyethylene (UHMWPE) particles having a percent change of basic flowability energy (BFE) relative to the preconditioned UHMWPE particles of at least 10%.

According to another aspect ("Aspect 61") a composition includes conditioned ultra-high molecular weight polyethylene (UHMWPE) particles having a percent change of specific energy (SE) relative to the preconditioned UHMWPE particles of at least 20%.

According to another aspect ("Aspect 62") use of the composition of any one of Aspects 54 to 60 in a binder system.

According to another aspect ("Aspect 63") use of the composition of any one of Aspects 54 to 60 as a binder in the formation of an anode, a cathode or a combination thereof.

According to another aspect ("Aspect 64"), a composite binder system includes the composition of any one of Aspects 54 to 60 and filler particles.

According to another aspect ("Aspect 65") further to Aspect 64, where the composite binder system has at least 95 wt % filler particles.

According to another aspect ("Aspect 66") an electrode includes filler particles and the composition of any one of Aspects 54 to 60.

According to another aspect ("Aspect 67") further to Aspect 66, including at least 95 wt % of the filler particles.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure. The figures are not necessarily drawn to scale but may be exaggerated to illustrate various aspects of the present disclosure, and in that regard, the figures should not be construed as limiting.

DETAILED DESCRIPTION

Definitions and Terminology

Figure 1:
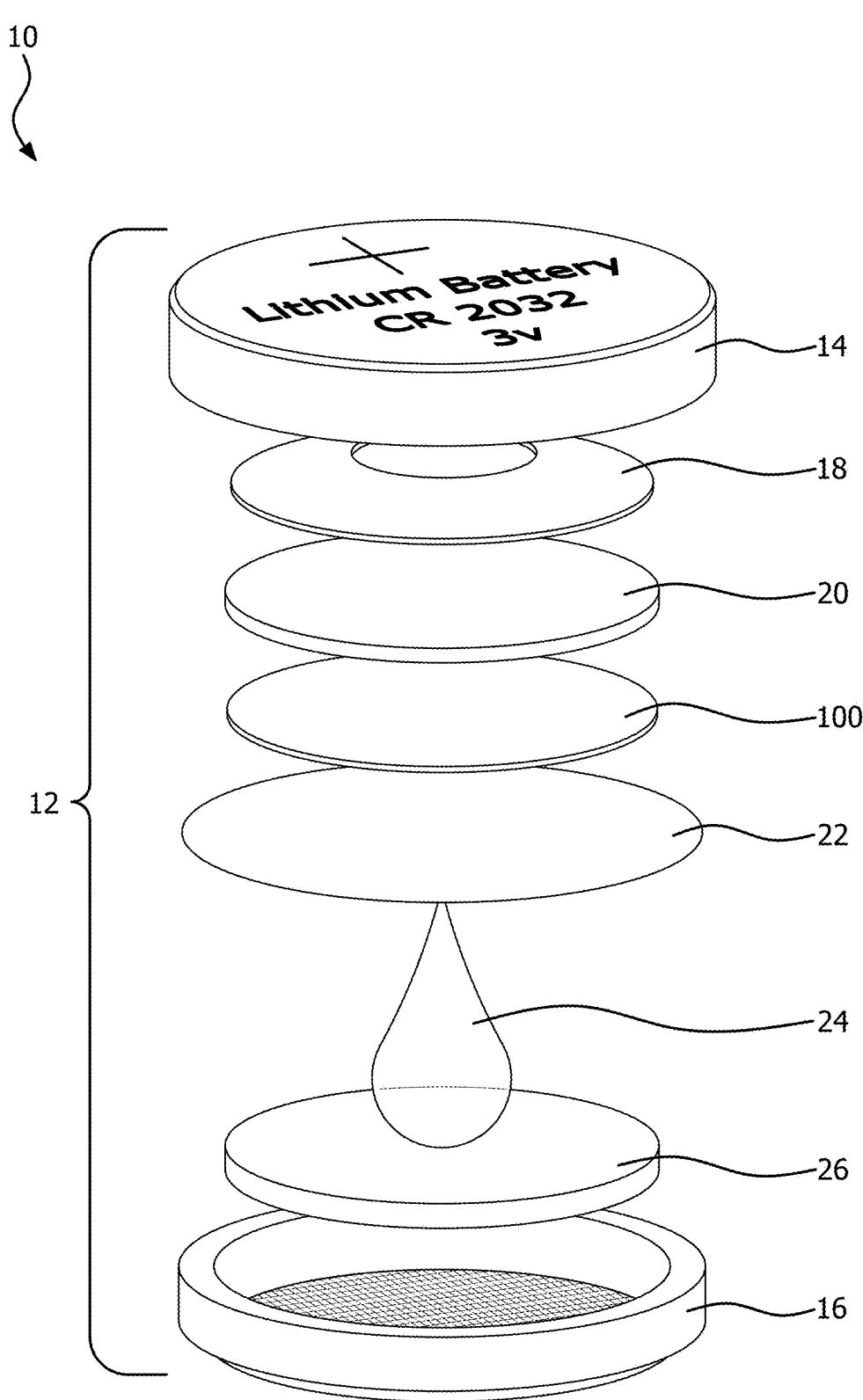
FIG. 1 is a half-cell of a power storage device implementing electrodes formed from blended filler and binder particles in accordance with embodiments disclosed herein.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. In the event it is determined that individuals having ordinary skill in the relevant arts would not readily ascertain values for such reasonably small differences, the terms "about" and "approximately" can be understood to mean plus or minus 10% of the stated value.

As used herein, the term "fibril" refers to the characteristic shapes of elements within the structure of a material. The structural characteristics of a fibril can be described as small fibers, generally with a width of 10 nm to 900 nm.

As used herein, the terms "fibrillizable" refers to the ability of forming fibrils in a polymer.

As used herein, the term "fibrillized" refers to the presence of fibrils in a polymer.

As used herein, the term "fibrillize" refers to the process of forming fibrils in polymers.

As used herein, the terms "fibrillatable" "fibrillate" and "fibrillation" refer to the ability of a polymer to form a fibril microstructure via solid state deformation. The fibril microstructure is capable of durably enmeshing other particles within the fibrils. The ability of a polymer to form a fibril microstructure under solid state deformation and the fibril microstructure being capable of durably enmeshing other particles within the fibrils may be characterized, for example, by the presence of an extended chain crystallization (ECC) fibrillation peak. In at least some embodiments, this is understood to be related to the formation of extended chain crystals. A fibrillated polymer may have other particles durably enmeshed within the fibril microstructure of the fibrillated polymer, and thus the fibrillated polymer may be used to bind the other particles.

The term "fibrillated", as used herein, is meant to denote a polymer that contains a fibril microstructure formed by solid state deformation.

As used herein, the term "fibrillating" refers to the process of forming fibrillated polymers by solid state deformation.

As used herein, the term "DSC peak" refers to an endothermic peak identified in data from differential scanning calorimetry, the endothermic peak typically being associated with a phase transition in a material.

As used herein, the term "nascent peak" refers to a DSC peak characteristic of a melt in a resin as polymerized.

As used herein, the term "reversible melt peak" refers to a DSC peak characteristic of a melt in a material that has been melted at least once. The reversible melt peak is typically observed at a temperature that is lower than the temperature associated with a nascent peak. The temperature at which the "reversible melt peak" is observed typically does not change significantly upon repeated measurement.

As used herein, the terms "extended chain crystal fibrillation peak" or "ECC fibrillation peak" refer to a DSC peak characteristic of a phase transition in a material that has been processed via solid state deformation and exhibits fibrillation. The ECC fibrillation peak is higher than the nascent peak. It is to be appreciated that the ECC fibrillation peak of a polymer that has been fibrillated is distinct from the nascent peak and the reversible melt peak.

The incumbent methodology used to produce most commercial lithium-ion batteries is called the "wet process." As used herein, the term "wet process" refers to a process by which the materials to be coated (e.g., electrode constituents such as active materials, conductive carbons, and binders) are suspended or homogenized in a liquid processing aid (e.g., solvents such as N-methylpyrrolidone (NMP) or water), and the resulting mixture (sometimes called a slurry or paste) is then coated onto a substrate (e.g., a metal foil) via a thin-film liquid coating technique (e.g., slot-die coating), dried to substantially remove the liquid processing aid, and optionally calendered to a desired thickness. The materials to be coated, liquid processing aids, substrates, and thin-film liquid coating techniques listed in this paragraph are illustrative only and are not intended to limit the definition of "wet process."

As used herein, the terms "solvent-free process" and "solvent-free processing" refer to a process by which materials are formed into an article using methodologies that are substantially free of liquid processing aids, and that therefore substantially avoid the need for a drying step to remove the liquid processing aids. There are multiple "solvent-free" processes including, but not limited to, dry powder spray, dry hot pressing, dry 3D printing, melt extrusion, and the dry electrode process (DE process).

As used herein, the term "dry electrode process" (DE process) is meant to denote to a process in which the formation of an electrode includes applying shear forces to a blend of binder and filler particles such that fibrillatable particles fibrillate to bind the filler particles together. The resulting electrode may or may not be self-supporting and may optionally be calendered to a desired thickness and/or attached to a substrate such as a metal foil, all of which is considered within the purview of the disclosure.

As used herein, the term "solvent" is used broadly and inclusively and refers to liquids such as water; common organic solvents such as N-methylpyrrolidone (NMP), alcohols, and ketones; mixtures of alkanes; and other liquid processing aids; and is not intended to limit the definition of "solvent-free process" to only those cases where a dissolved solute is present.

As used herein, "UHMWPE" includes ultra-high molecular weight homopolymer polyethylene and modified UHMWPE resins having a molecular weight greater than or equal to 2,000,000 g/mol, a melt enthalpy of about 190 J/g, and a bulk density from about 0.04 g/mL to about 0.25 g/mL.

As used herein, the terms "filler" and "filler particles" refer to functional particles other than binders. For example, filler particles may include materials with properties facilitating specific functions of an article when the filler particles are processed as part of the article. In a more specific example, filler particles processed to form an electrode may include electrically conductive materials and electrochemically active materials (e.g., lithium intercalation compounds).

As used herein, the terms "binder" and "binder particles" refer to particles and materials that have a primary purpose to constrain other materials and particles into a cohesive structure.

As used herein, the term "loading" refers to the percent of filler on a weight basis in a blend of filler and binder.

As used herein, the terms "condition" and "conditioned" are meant to refer to a process whereby the size and/or the shape of the UHMWPE particles are altered.

As used herein, the term "area equivalent diameter" (Da), corresponds to a diameter of a circle equal to that of the area of the particle image. In some embodiments, the Da can be measured via a Microtrac Sync Particle Analyzer (combining laser diffraction analysis (ISO 13320:2020) and dynamic image analysis (ISO: 13322-2)) (Microtrac MRB in Pennsylvania, USA). Additionally, Da may be used to quantify the shape of a particle.

As used herein, the term "sphericity" refers to the measure of shape of an object's 2-dimensional image and its proximity to a perfectly circular shape. Values of sphericity range from 0 to 1, with 1 being a perfect circle. Sphericity may be used to quantify the shape of a particle.

As used herein, the term "convexity" refers to a measure of surface roughness. Values of convexity range from 0 to 1, with 1 being smooth. As values go to 1, measures of circularity increase.

As used herein, the term "L/W ratio" refers to a ratio of the major axis to a minor axis of a best-fit Legendre ellipse. The L/W ratio may be measured from a particle image taken with a Microtrac Sync Particle Analyzer, available from Microtrac MRB in Pennsylvania, USA. In addition, the L/W ratio may be used to quantify the shape of a particle.

The terms "composition" and "mixture" may be used interchangeably herein.

The terms "resin particle" and "resin powder" may be used interchangeably herein.

DESCRIPTION OF VARIOUS EMBODIMENTS

Persons skilled in the art will readily appreciate that various aspects of the present disclosure can be realized by any number of methods and apparatuses configured to perform the intended functions.

Historically, a major impediment to the adoption of the dry electrode process has been the limited selection of viable binders. The binder requirements for the dry electrode process are significantly different from the wet process. For the wet process, binders form adhesive bonds between electrode constituents that "glue" them together, and typical binders include polyvinylidene fluoride (PVDF), carboxymethyl cellulose (CMC), and styrene butadiene rubber (SBR). This type of binder may be referred to as an adhesive binder. However, the dry electrode process uses binders that form fibrils under the application of shear forces. Despite discussion of and speculation about other polymers being used as fibrillizable binders, in practice the dry electrode process has relied upon the use of polytetrafluoroethylene (PTFE). This discrepancy is due to the fact that having a polymer capable of producing fibrils is not a sufficient criterion to enable the dry electrode process (e.g., incorporating the filler(s) into product). Based on the foregoing discussion, a distinction is made between "fibrillizable" binders and "fibrillatable" binders, with the latter being formed through solid state deformation. It is important to enable the dry electrode process by durably enmeshing filler particles within the fibril microstructure of the binder formed during solid state deformation. This is because while other polymers may fibrillize under certain conditions, they will not fibrillate sufficiently to durably enmesh filler materials when subjected to the dry electrode processes currently in use.

It is well known that PTFE will fibrillate simply from handling a PTFE resin at room temperature. Furthermore, PTFE is capable of substantial deformation in the solid state. One factor that allows PTFE resin to directly fibrillate is that it is polymerized with a very high crystallinity. This high crystallinity is indicative of a low level of entanglement. Another factor that allows PTFE to directly fibrillate is that PTFE resin has a very high molecular weight. This combination allows high draw ratios of PTFE in the solid state. PTFE's solid state deformation properties are relied upon in much of PTFE processing, including in the dry electrode processes that are currently in use. This capability for large solid-state deformation is at least partially enabled by the low entanglement level in polymerized PTFE resin. In dry electrode processes, PTFE resin may be added to the process and directly fibrillated in the solid state to durably enmesh filler particles. These properties of PTFE enable high filler loading when used in the dry electrode process.

While PTFE is a versatile polymer that is suitable for many applications, it has some limitations and may not be optimal for all cases. For example, PTFE is not fully stable in contact with lithium metal or at the strongly reducing conditions of a typical (i.e., graphite-based) lithium-ion anode. Also, the density of PTFE is about twice that of hydrocarbon-based binders, which may reduce gravimetric energy density. Also, PTFE also has a very low surface energy that may pose challenges to electrolyte wetting.

Because of these properties and characteristics of PTFE, there is an interest in identifying additional or alternative materials (e.g., non-Lithium reactive materials, lighter materials, and so forth) that can fibrillate to durably enmesh filler particles in the dry electrode process.

Although it is known in the art that some polymers are fibrillizable, fibrillization alone is not inherently capable of durably enmeshing filler particles at high loadings with high strength. When others have speculated as to other potential fibrilizable binders other than PTFE that may be used in the dry electrode process (e.g., as discussed in US Patent Publication No. 2005/0057888 to Mitchell, et al., published Mar. 17, 2005, which discusses that other "potential fibrillizable binders include ultra-high molecular weight polypropylene, polyethylene, co-polymers, polymer blends and the like") they fail to appreciate how PTFE differs from other fibrillizable polymers. PTFE is a fibrillizable polymer that is fibrillatable, meaning capable of forming fibrils via solid state deformation. Fibrillatable binders are required to durably enmesh filler particles at high loadings with high strength. Many other fibrillizable polymers are not fibrillatable, for example they may form fibrils predominantly via thermoplastic extrusion rather than by solid-state deformation.

Within the field of polyolefins (e.g., polypropylene, polyethylene, and so forth), polyethylene includes many categories into which polyethylene may be divided. These categories include low-density polyethylene (LDPE), linear low-density polyethylene (LLDPE), medium-density polyethylene (MDPE), high-density polyethylene (HDPE), high molecular weight polyethylene (HMWPE), and ultra-high molecular weight polyethylene (UHMWPE). In accordance with the findings reported herein, LDPE's, LLDPE's, MDPE's, and HDPE's may be suitable for fibrillization in the thermoplastic process. UHMWPE is not suitable for the thermoplastic processes because the viscosity is too high. Within the classification of UHMWPE, there are a small number of resins classified as low entanglement (sometimes designated "dUHMWPE"). In order to preserve low entanglement of the dUHMWPE resin, the UHMWPE resins should be used in processes below the melting temperature. Furthermore, UHMWPE resins have low extension rates. These low extension rates are not compatible with the high shear rates typically used in dry electrode processes. Stated otherwise, high-speed blending or milling is not compatible with the deformation capability of the low-entanglement UHMWPE resin.

PTFE resins can vary greatly in particle size and/or shape with granular PTFE being the more common. Although those implementing the dry electrode process discuss the use of PTFE as a binder, the PTFE resin morphology is not identified as an important factor. The present disclosure identifies, first, that low-entanglement polyethylene resins of high molecular weight are needed for a high degree of solid-state deformation and, second, that particle morphology of the low-entanglement high molecular weight polyethylene resin is an important factor in producing a highly loaded article. The low-entanglement high molecular weight resin with the particle morphology as described herein is capable of producing highly loaded articles via the dry electrode process because of its ability to fibrillate in order to durably enmesh filler particles.

The disclosure herein relates to methods of forming UHMWPE articles via a dry electrode process. This disclosure further relates to a dry electrode process that implements UHMWPE as a viable binder. The specific characteristics of UHMWPE are discussed that facilitate the use of UHMWPE in dry electrode processes. The UHMWPE particles as discussed herein have specific characteristics that make it possible to form fibrillated articles. The fibrillatable and/or fibrillated UHMWPE particles discussed herein are compatible with solid state deformation processes, including those relating to dry electrode processes (including but not limited to high-speed blending, milling, and calendering). More specifically, the UHMWPE particles and processes discussed herein fibrillate in dry electrode processes, and the fibrillation is evidenced by an ECC fibrillation peak in a DSC graph of the produced article.

Solvent-free processing, and particularly dry electrode processing, of materials reduces material consumption, energy consumption, and environmental impact. The disclosed processes and materials provide increased strength of articles produced, thus facilitating increased loading of articles. In one example, the disclosed processes and materials facilitate the use of minimal UHMWPE necessary to bind materials together via dry electrode processing. Although specific examples of articles are provided herein, it is understood that any number of articles may be produced via the disclosed methods and compositions that may be implemented in various settings and industries. It is understood that the solvent-free processes discussed herein are intended to include those embodiments which are substantially solvent-free but may contain nominal amounts of moisture or other liquids.

The UHMWPE particles as discussed herein may be implemented, for example, as a binder (for example, as part of a binder system) in various processes, including a dry electrode process. The use of the UHMWPE particles as a binder, as discussed herein, facilitates the production of articles that are highly loaded.

In some examples, the fibrillated and/or fibrillatable binder particles may include ultra-high molecular weight polyethylene (UHMWPE). The UHMWPE particles may have an average molecular weight (Mv) (i.e., viscosity-average molecular weights) of at least 2,000,000 g/mol, or at least 3,000,000 g/mol, or at least 4,000,000 g/mol, or at least 5,000,000 g/mol, or at least 6,000,000 g/mol, or at least 7,000,000 g/mol. In some embodiments, the UHMWPE particles may have an average molecular weight in the range from 2,000,000 g/mol to 20,000,000 g/mol, or from 2,000,000 g/mol to 15,000,000 g/mol, or from 4,000,000 g/mol to 10,000,000 g/mol, or from 5,000,000 g/mol to 8,000,000 g/mol, or may have an average molecular weight in the range of any other range encompassed by these endpoints.

In some embodiments, the fibrillated and/or fibrillatable binder particles may include a high degree of crystallinity. The crystallinity of the UHMWPE particles may be measured by differential scanning calorimetry (DSC). The crystallinity of the UHMWPE particles is retained or substantially retained prior to conditioning or after conditioning, which is discussed herein. The UHMWPE particles have an enthalpy of the first melt at least about 190 J/g (i.e., dUHMWPE). In some embodiments, the first melt corresponds to a nascent peak. As used herein, the phrases "high crystallinity" or "highly crystalline" are meant to describe UHMWPE particles that have a first melt enthalpy greater than about 190 J/g as measured by DSC (i.e., integration of DSC curve from 100° C. to 175° C.). In another embodiment, the UHMWPE particles have a first melt enthalpy greater than about 195 J/g, about 200 J/g, about 205 J/g, about 210 J/g, about 215 J/g, about 220 J/g, about 225 J/g, about 230 J/g, about 235 J/g, about 245 J/g, about 250 J/g, about 255 J/g, about 260 J/g, about 265 J/g, about 270 J/g, or about 275 J/g. The UHMWPE particles have a melting point (e.g., the first melt) from about 139° C. to about 143° C. (e.g., the nascent peak). It is to be noted that the terms "melting temperature", "melt temperature", and "melting point" may be used interchangeably herein. In at least one embodiment, the UHMWPE particles have a melting point of approximately 140° C. Subsequent re-melting of the UHMWPE particles occurs at a temperature from about 127° C. to about 137° C. (e.g., the reversible melt peak). Additionally, the crystallinity of the UHMWPE particles may be described as at least 70%. In some embodiments, a lower limit of the crystallinity of the UHMWPE particles is about 70%, about 75%, about 80% about 85%, about 90%, or about 95%.

In some embodiments, the UHMWPE particles have an intrinsic viscosity in the range of about 5 dL/g to about 60 dL/g. An intrinsic viscosity of in the approximate range of about 5 dL/g to about 60 dL/g is a value measured in decalin at 135° C. The range of intrinsic viscosity in some embodiments is about 10 dL/g to about 45 dL/g, and in yet other embodiments is about 15 dL/g to about 40 dL/g.

The UHMWPE particles may be provided as agglomerations of fine particles. The average diameter of the fine particles is determined by observation using a scanning electron microscope (SEM). In some embodiments, the average particle diameter of the fine particles of the UHMWPE particles is greater than or equal to about 10 nm and less than about 3,000 nm. In some embodiments the average diameter of the fine particles of the UHMWPE particles is greater than or equal to about 10 nm and less than about 2,000 nm, and in other embodiments greater than or equal to about 10 nm and less than about 1,000 nm. In some embodiments, the average diameter of the fine particles of the UHMWPE particles is greater than or equal to 1 nm and less than or equal to 300 nm, greater than or equal to 1 nm and less than or equal to 250 nm, greater than or equal to 1 nm and less than or equal to 200 nm, greater than or equal to 1 nm and less than or equal to 150 nm, greater than or equal to 1 nm and less than or equal to 100 nm, or greater than or equal to 1 nm and less than or equal to 50 nm. As discussed herein, UHMWPE particles relate to the agglomeration of the fine particles described.

As discussed in Patent Publication No. WO 2012/053261 by Mitsui Chemicals, Inc. published Apr. 26, 2012, a UHMWPE resin may be prepared such that the UHMWPE particles are formed from an agglomeration of fine particles that the agglomerations include spaces or gaps therein and therebetween that are roughly equivalent to the size of the fine particles.

In addition, the UHMWPE particles (i.e., agglomeration of fine particles) may be a homopolymer of ethylene or a copolymer of ethylene and at least one comonomer. Suitable comonomers that may be used to form a UHMWPE copolymer include, but are not limited to, an alpha-olefin or cyclic olefin having 3 to 20 carbon atoms. Non-limiting examples of suitable comonomers include 1-butene, 1-pentene, 1-hexene, 1-heptene, 1-octene, cyclohexene, and dienes with up to 20 carbon atoms (e.g., butadiene or 1,4-hexadiene). Comonomers may be present in the UHMWPE copolymer in an amount from about 0.001 mol % to about 10 mol %, from about 0.01 mol % to about 5 mol %, from about 0.1 mol % to about 1 mol %, or any other amount encompassed within these endpoints.

In some embodiments, the UHMWPE particles (i.e., agglomeration of fine particles) may be provided in a UHMWPE resin. The UHMWPE resin may include fibrillatable UHMWPE particles as described herein (e.g., having molecular weight of at least 2,000,000 g/mol, a melt enthalpy of at least 190 J/g, and a bulk density from about 0.04 g/mL to about 0.25 g/mL). The bulk density of the UHMWPE resin ranges from about 0.04 g/mL to about 0.25 g/mL, from about 0.04 g/mL to about 0.15 g/mL, from about 0.04 to 0.12 g/mL, from about 0.04 g/mL to about 0.10 g/mL, from about 0.05 g/mL to 0.15, or from about 0.06 g/mL to about 0.08 g/mL. When conditioned, the UHMWPE particles of the UHMWPE resin may, on average, have a median sphericity from about 0.820 to about 0.880, a median convexity from about 0.950 to about 0.990 and a median L/W ratio from about 1.5 to about 1.80.

In some embodiments, the UHMWPE particles (i.e., agglomeration of fine particles) may be conditioned prior to blending with the filler particles. In some embodiments, the UHMWPE particles can be conditioned by, as a non-limiting embodiment, shear mixing, to alter the size and shape of the UHMWPE particles. Some examples of particle sizes and shapes of the conditioned UHMWPE particles of several samples are shown in Table 1 (included with Example 1). Sample 1 shows the particle size and length/width ratio of UHMWPE particles of an unconditioned UHMWPE resin, and Samples 2-7 show the UHMWPE particle size and length/width ratio of conditioned UHMWPE.

When UHMWPE particles (i.e., agglomeration of fine particles) are conditioned, the UHMWPE particles (i.e., agglomeration of fine particles) may have a median Da of less than about 300 microns. In some embodiments, the conditioned UHMWPE particles may have a median Da from about 5 microns to about 300 microns. In some embodiments, the UHMWPE particles may have a median Da from about 5 microns to about 275 microns, from about 5 microns to about 250 microns, from about 5 microns to about 225 microns, from about 5 to about 200 microns, from about 5 microns to about 175 microns, from about 5 microns to about 150 microns, from about 5 microns to about 125 microns, from about 5 to about 100 microns, from about 5 microns to about 75 microns, from about 5 microns to about 50 microns, from about 5 microns to about 15 microns, from about 5 microns to about 10 microns, or from about 5 microns to about 8 microns. In some embodiments, the conditioned UHMWPE particles have a median Da, from about 10 microns to about 300 microns, from about 10 microns to about 200 microns, from about 10 microns to about 100 microns, from about 10 microns to about 50 microns, from about 10 microns to about 40 microns, from about 10 microns to about 30 microns, or from about 10 microns to about 20 microns. In some embodiments, the conditioned UHMWPE particles may have a median Da from about 20 microns to about 25 microns, from about 25 microns to about 30 microns, from about 30 microns about 35 microns, from about 35 microns to about 40 microns, from about 40 microns to about 45 microns, from about 45 microns to about 50 microns, from about 50 microns to about 55 microns, from about 55 microns to about 60 microns, from about 60 microns to about 65 microns, from about 65 microns to about 70 microns, from about 70 microns to about 75 microns, from about 75 microns to about 80 microns, from about 80 microns to about 85 microns, from about 85 microns to about 90 microns, from about 90 microns to about 95 microns, from about 95 microns to about 100 microns, from about 100 microns to about 125 microns, from about 125 microns to about 150 microns, from about 150 microns to about 175 microns, from about 175 microns to about 200 microns, from about 200 microns to about 225 microns, from about 225 microns to about 250 microns, from about 250 microns to about 275 microns, or from about 275 microns to about 300 microns.

When UHMWPE particles (i.e., agglomeration of fine particles) are conditioned, the UHMWPE particles (i.e., agglomeration of fine particles) may have a median sphericity from about 0.820 to about 0.880. In some embodiments, the UHMWPE particles may have a median sphericity from about 0.820 to about 0.825, from about 0.825 to about 0.830, from about 0.830 to about 0.835, from about 0.835 to about 0.840, from about 0.840 to about 0.845, from about 0.845 to about 0.850, from about 0.850 to about 0.855, or from about 0.855 to about 0.860.

When UHMWPE particles (i.e., agglomeration of fine particles) are conditioned, the UHMWPE particles (i.e., agglomeration of fine particles) may have a median convexity from about 0.950 to about 0.990. In some embodiments, the UHMWPE particles may have a median convexity from about 0.950 to about 0.955, from about 0.955 to about 0.960, from about 0.960 to about 0.965, from about 0.965 to about 0.970, from about 0.970 to about 0.975, or from about 0.975 to about 0.980.

When UHMWPE particles (i.e., agglomeration of fine particles) are conditioned, the UHMWPE particles (i.e., agglomeration of fine particles) may have a median L/W ratio from about from about 1.50 to about 1.80 In some embodiments, the UHMWPE particles may have a median L/W ratio from about 1.60 to about 1.62, from about 1.62 to about 1.64, from about 1.64 to about 1.66, from about 1.66 to about 1.68, or from about 1.68 to about 1.70.

As noted, when UHMWPE particles are conditioned, the crystallinity of the UHMWPE particles is retained or substantially retained. Thus, both conditioned and unconditioned particles have about the same crystallinity.

The fibrillated and/or fibrillatable binder particles including the UHMWPE particles (either conditioned or unconditioned) may be blended with filler particles. The filler particles are selected to perform a certain function of the final product, including, but not limited to, conducting electrons, conducting ions, electrochemically reacting, and so forth. In some embodiments, the filler particles may be selected to conduct electricity and/or act as a reagent in energy storage devices (e.g., for use in an electrode). Fibrillated and/or fibrillatable binder particles are selected to bind the filler particles together. The fibrillated and/or fibrillatable binder particles are sufficiently strong and stable to provide the structural qualities desired to maximize the ratio of filler particles to fibrillated and/or fibrillatable binder particles for a particular purpose (e.g., maximizing the filler loading or maximizing the strength of an article). Multiple binders may be included in the blend (i.e., a "binder system"), and the binders may be of multiple types (e.g., a combination of fibrillatable binders and adhesive binders). In some embodiments, the filler particles may include organic particles, inorganic particles, and combinations thereof added to facilitating specific functions within a composite article (comprising the filler particles durably enmeshed with the present polymeric binders). In another embodiment, the filler particles may include, but are not limited to, electrically-conductive materials, electrochemically-active materials, thermally-conductive materials, catalytically-active materials (e.g., inorganic catalysts, enzymes, etc.), thermally-insulative materials, electronically-insulative materials, pigmented materials, opacifiers, reinforcement fibers, and the like.

In some embodiments, the filler particles may be selected for their various properties and characteristics. In some embodiments, the filler particles may be selected for conductivity or corrosion resistance. Some examples of filler particles that may be selected, either alone or in combination, include but are not limited to lithium cobalt oxide, lithium manganese oxide, lithium nickel manganese cobalt oxide (e.g., NMC-111, NMC-532, NMC-622, NMC-811), lithium nickel cobalt aluminum oxide, lithium iron phosphate, lithium manganese iron phosphate, and other lithium-ion battery cathode materials (collectively known as "lithium compound particles"); graphite, silicon, lithium titanate, and other lithium-ion battery anode materials; carbon black; solid electrolytes (e.g., Garnet-type, Perovskite-type, Sulfide-type, LiPON-type, LisN-type, polymer-type, LISICON, NASICON); activated carbon, hard carbon, carbon nanotubes, graphene, fullerenes, and other allotropes of carbon; sulfur; sodium transition metal oxides; nickel, iron, cobalt, alloys of the same, oxides and mixed oxides of the same, other transition metal compounds including both supported (e.g., on carbon or ceria) and unsupported versions. In some embodiments, any other materials that may be implemented as the filler particles include any other materials that may be implemented in lithium-ion battery cathodes, lithium-ion battery anodes, solid state batteries, alternative battery chemistries, supercapacitors, electrodes, and so forth.

Turning to a discussion of the blended particle composition, in some embodiments, the blended particle composition includes less than 10% fibrillated and/or fibrillatable binder particles by weight. In some embodiments, the blended particle composition may include at least 90% by weight of filler particles and 10% or less by weight of fibrillated and/or fibrillatable binder particles. In some embodiments, the ratio of filler particles and fibrillated and/or fibrillatable binder particles in the blended particle composition allows for an article formed of the blended particle composition to be self-supporting. In some embodiments, the blended particle composition may include at least about 90%, about 91%, about 92%, about 93%, about 94%, about 95%, about 96%, about 97%, about 98%, or about 99% (or more) by weight of filler particles. In some embodiments, the blended particle composition may include about 10%, about 9%, about 8%, about 7%, about 6%, about 5%, about 4%, about 3%, about 2%, or about 1% or less by weight of fibrillated and/or fibrillatable binder particles. Other loaded articles formed of the blended particle composition may include about 5%, about 10%, about 15%, about 20%, about 25%, about 30%, about 35%, about 40%, about 45%, about 50%, about 55%, about 60%, about 65%, about 70%, about 75%, about 80%, or about 85% by weight filler particles with at least a portion of the remaining portion of the blended particle composition including the fibrillated and/or fibrillatable binder particles (e.g., about 95%, about 90%, about 85%, about 80%, about 75%, about 70%, about 65%, about 60%, about 55%, about 50%, about 45%, about 40%, about 35%, about 30%, about 25%, about 20%, or about 15% by weight). The article may be a sheet, a fiber, a tube, or a three-dimensional structure, and the article may be attached to a substrate (e.g., an article in sheet form may be bonded to a metal foil). Furthermore, the article may include articles formed by a powder application process whereby a blended mix of filler and binder particle is directly formed or bonded onto a substrate. That substrate could be, for example, a metal foil.

With reference to some specific embodiments, the filler particles may comprise at least about 90% by weight of the blended particle composition. In some embodiments, the high ratio of filler particles to binder particles facilitates the ability to substantially maintain the properties and characteristics of the filler particles for the entire blended particle composition (e.g., the properties and characteristics for which the filler particles are selected are not substantially diminished or diluted). It is understood that various ratios of filler and binder particles may be desirable in different applications. UHMWPE particles described herein can be blended and calendered with the filler particles in a manner generally discussed in US Patent Publication No. 2005/0057888 to Mitchell, et al., published Mar. 17, 2005, which yields composites with at least the properties (e.g., tensile stress and strain loads) shown in Table 1. By using the specific UHMWPE particles discussed herein, the composites yielded have sufficient filler particle content (e.g., highly loaded) to perform the intended functions of the article produced from the blended particle composition as well as sufficient strength imparted by the fibrillated UHMWPE particles.

Figure 2:
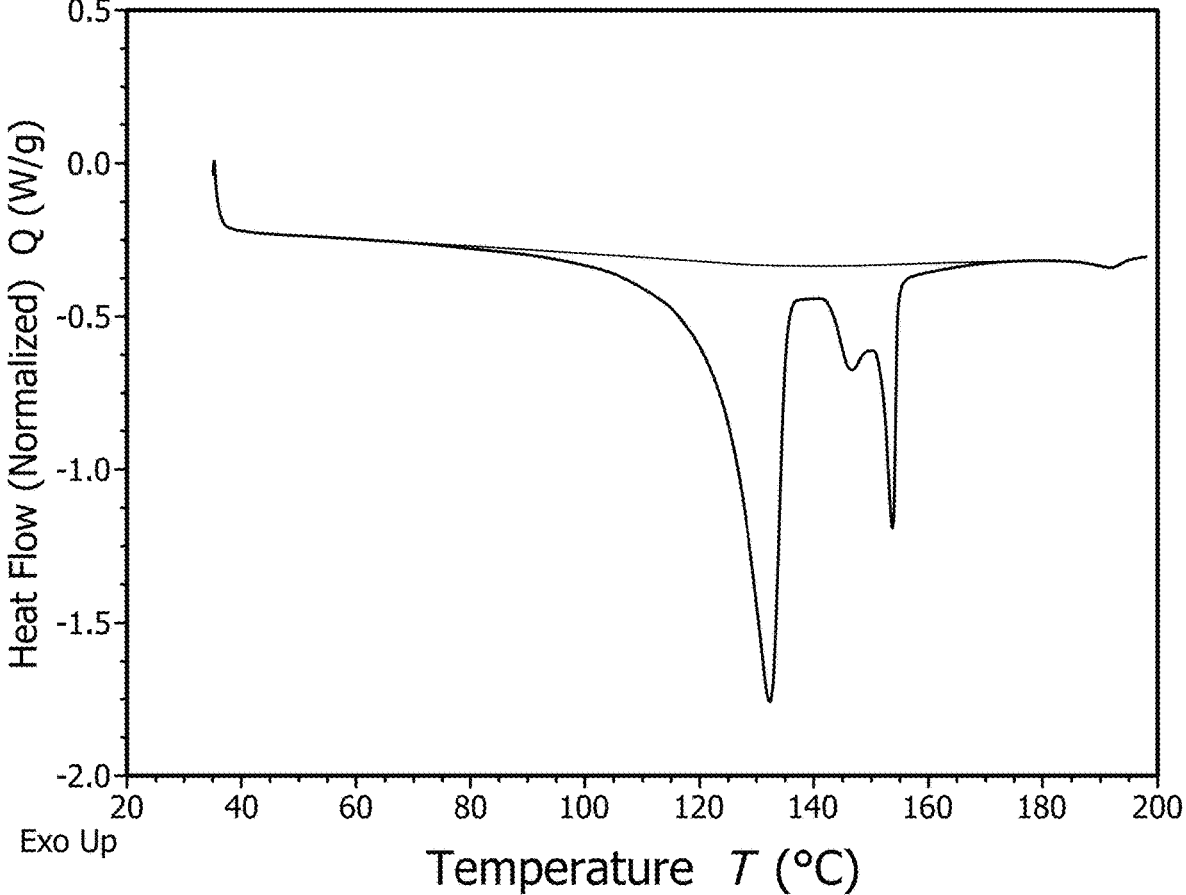
FIG. 2 is a differential scanning calorimetry (DSC) thermogram depicting a single melting point of a UHMWPE resin, as polymerized in accordance with embodiments disclosed herein.
Figure 3:
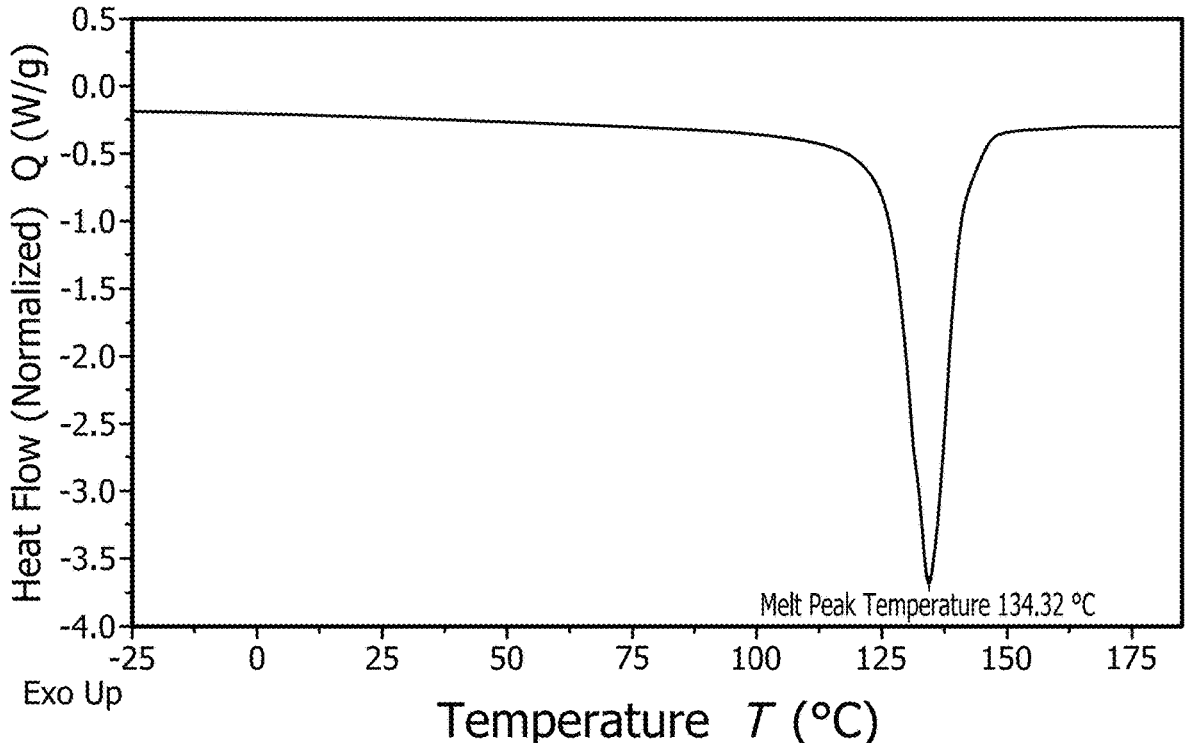
FIG. 3 is a differential scanning calorimetry (DSC) thermogram depicting a single melting point typical of an article produced using conventional ultrahigh molecular weight polyethylene (UHMWPE) particles in accordance with embodiments disclosed herein.
Figure 4:
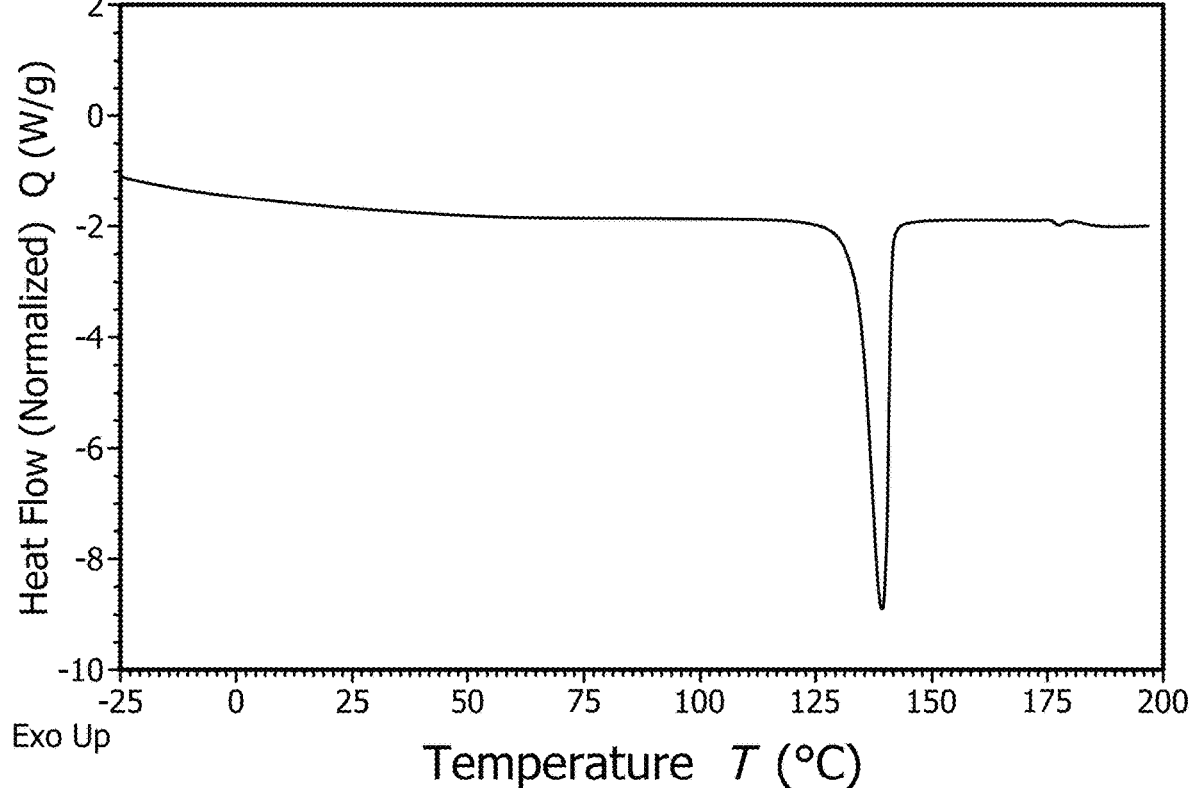
FIG. 4 is a differential scanning calorimetry (DSC) thermogram of an article produced from conditioned UHMWPE particles where the thermograph depicts a melting point associated with extended chain crystals (ECC) fibrillation in accordance with embodiments disclosed herein.

When the UHMWPE particles as described herein (e.g., particle morphology and other properties and characteristics described herein) are formed into an article via dry electrode processing, the UHMWPE particles include a fibril structure (e.g., substantially fibril structure) which provides certain characteristics to the article, for example, tensile strength (i.e., as demonstrated by tensile stress at maximum (max) load). The UHMWPE may have an endotherm from about 145° C. to about 155° C., about 150° C. or about 152° C. (i.e., the ECC fibrillation peak), that is associated with fibrillation (i.e., durably enmeshing or capable of durably enmeshing) of UHMWPE (i.e., determination of the DSC peak may be implemented for the ECC fibrillation peak by integrating the data from the DSC thermograph between 143° C. and 175° C.). As discussed, DSC can be used to identify the phase transition temperatures of the UHMWPE particles in the article. FIG. 4 shows a DSC thermograph of an example UHMWPE article having a reduced phase transition temperature at about 132° C. (e.g., reversible melt peak) and an endotherm at approximately 152° C. (e.g., ECC fibrillation peak). This approximate 152° C. peak (or endotherm) is indicative of fibrillation of the UHMWPE article, for example fibrils formed during solid-state deformation. It is to be appreciated that an endothermic peak of about 152° C. is not present in conventional processed UHMWPE articles but is present in the filled UHMWPE articles produced by the dry electrode process according to the present disclosure and shown in the Examples included herein. An endothermic peak of about 152° C. peak is also described for example in U.S. Pat. No. 9,926,416 to W. L. Gore & Associates, Inc. issued on Mar. 27, 2018. For reference, a DSC thermograph of a UHMWPE resin is shown in FIG. 2, the DSC thermograph depicting the nascent peak of the resin as polymerized at approximately 140° C. For further reference, a DSC thermograph for a conventional UHMWPE article is shown in FIG. 2, depicting the single melting peak at approximately 134° C. (determination of DSC peak may be implemented for the reversible melt peak by integrating the data from the DSC thermograph between 100° C. and 143° C.).

When fibrillation of the UHMWPE (according to the present disclosures) occurs during the dry electrode process, the produced article will have a DSC peak at about 152° C. The degree of fibrillation of the UHMWPE may be characterized by an integration of the ECC fibrillation peak as compared to the portions of the DSC curve including both the ECC fibrillation peak and the reversible melt peak as well as any residual nascent peak (e.g., integration of the DSC curve for peaks between 143° C. and 175° C. as compared to an integration of the DSC curve between 100° C. and 175° C.; hereinafter the "fibrillation percentage"). Conversely, the degree to which the UHMWPE does not fibrillate may be characterized by an integration of the reversible melt peak as compared to the portions of the DSC curve including both the ECC fibrillation peak and the reversible melt peak as well as any residual nascent peak (e.g., integration of the DSC curve for peaks between 100° C. and 143° C. as compared to an integration of the DSC curve between 100° C. and 175° C.; the "non-fibrillation percentage"). UHMWPE particles that do not have the properties and characteristics as described herein will have low fibrillation (e.g., a low fibrillation percentage). Low fibrillation is represented by a low ratio of the ECC fibrillation peak as compared to the sum of the ECC fibrillation peak and the reversible melt peak as well as any residual nascent peak (e.g., a low fibrillation percentage) and is also represented by a high ratio of the reversible melt peak as compared to the sum of the ECC fibrillation peak and the reversible melt peak (e.g., a high non-fibrillation percentage). The method of integration of these peaks as described in this paragraph assumes that the DSC peaks are attributable to the UHMWPE resin as described herein, and not attributable to the filler, for example. If artifacts are present in the DSC data that are attributed to, for example, the filler, then the DSC data must be corrected by, for example, subtracting a suitable background to approximately isolate the peaks attributed to the UHMWPE particles.

As described herein, articles produced using UHMWPE with the characteristics described herein and subjected to the processes described herein demonstrate fibrillation as shown by a fibrillation percentage of the article being greater than 0%. In some embodiments, the articles produced according to the discussion herein include a fibrillation percentage of about 1% or greater, about 2% or greater, about 3% or greater, about 4% or greater, about 5% or greater, about 6% or greater, about 7% or greater, about 8% or greater, about 9% or greater, about 10% or greater, about 15% or greater, about 20% or greater, about 25% or greater, about 30% or greater, about 35% or greater, about 40% or greater, about 45% or greater, about 50% greater, about 55% or greater, about 60% or greater, about 65% or greater, about 75% or greater, about 80% or greater, about 85% or greater, about 90% or greater, about 95% or greater, or about 100%. In some embodiments, the articles produced according to the discussion herein may have a fibrillation percentage from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 100%. A produced article may undergo fibrillation and have a fibrillation percentage as discussed herein that is indicative of fibrillation, and then post-processed above the melting temperature (e.g., above 152° C.). When post-processing above the melting temperature occurs after fibrillation, it is understood that the ECC fibrillation peak may be diminished or may no longer be represented in the DSC data. This disclosure is not intended to be limited to a final product including the fibrillation percentages described above but is instead understood to incorporate articles at any point in production that are processed according to the present disclosure and therefore include the properties and characteristics as described herein.

In one embodiment, the blended particle composition (e.g., the filler particles and the fibrillated and/or fibrillatable binder particles) may be implemented to form an article such as a three-dimensional structure or alternatively a sheet (e.g., a self-supporting sheet or a non-self-supporting sheet). In some embodiments, the blended particle composition can be applied directly to a secondary substrate (e.g., deposited, adhered, coupled, etc.). Some articles may be formed from the blended particle composition via a calendering process. Some embodiments include an article formed from a blended particle composition including at least 90% by weight of filler particles and 10% or less by weight of binder particles.

The blended particle composition may be prepared by processing the filler particles and the UHMWPE particles (conditioned or non-conditioned having the characteristics discussed herein) under sufficient shear (e.g., in a manner generally discussed in US Patent Publication No. 2005/0057888 to Mitchell, et al., published Mar. 17, 2005) to facilitate fibrillation of the UHMWPE particles. The blended particle composition may then be used to form various articles. For example, the blended particle composition may be formed into a composite sheet (e.g., self-supporting) of the filler particles durably enmeshed in the binder (e.g., fibrillated UHMWPE particles). The composite sheet may have a thickness of about 10 microns or greater (e.g., from about 10 microns to about 500 microns, from about 10 microns to about 20 microns, from about 20 microns to about 30 microns, from about 30 microns to about 40 microns, from about 40 microns to about 50 microns, from about 50 microns to about 60 microns, from about 60 microns to about 70 microns, from about 70 microns to about 80 microns, from about 80 microns to about 90 microns, from about 90 microns to about 100 microns, from about 100 microns to about 120 microns, from about 120 microns to about 140 microns, from about 140 microns to about 160 microns, from about 160 microns to about 180 microns, from about 180 microns to about 200 microns, from about 200 microns to about 250 microns, from about 250 microns to about 300 microns, from about 300 microns to about 350 microns, from about 350 microns to about 400 microns, from about 400 microns to about 450 microns, or about 450 microns to about 500 microns).

The composite sheet may have a tensile stress at maximum (max) load from about 2,500 kPa to about 7,000 kPa (e.g., about 2,500 kPa to about 3,000 kPa), from about 3,000 kPa to about 3,500 kPa, from about 3,500 kPa to about 4,000 kPa, from about 4,000 kPa to about 5,500 kPa, from about 4,500 kPa to about 5,000 kPa, from about 5,000 kPa to about 5,500 kPa, from about 5,500 kPa to about 6,000 kPa, from about 6,000 kPa to about 6,500 kPa, or from about 6,500 kPa to about 7,000 kPa). The composite sheet may have a tensile strain at maximum (max) load from about 3.0% to about 10.0% (e.g., from about 3.0% to about 3.5%, from about 3.5% to about 4.0%, from about 4.0% to about 4.5%, from about 4.5% to about 5.0%, from about 5.0% to about 5.5%, from about 5.5% to about 6.0%, from about 6.0% to about 6.5%, from about 6.5% to about 7.0%, from about 7.0% to about 7.5%, from about 7.5% to about 8.0%, from about 8.0% to about 8.5%, from about 8.5% to about 9.0%, from about 9.0% to about 9.5%, or from about 9.5% to about 10.0%). The composite sheet may have a tensile strain at break from about 5.0% to about 50.0% (e.g., about 5.0%, about 6.0%, about 7.0%, about 8.0%, about 9.0%, about 10.0%, about 15%, about 20%, about 25%, about 30%, about 40%, or about 50%). The formation of the article (e.g., sheet) may occur via a calendering process.

Various other articles (e.g., films, sheets, tapes, etc.) may be formed from the blended particle composition and those articles may be implemented in various settings. In some embodiments, the articles produced from the blended particle composition may be applied to another substrate. In one embodiment, the articles produced from the blended particle composition may be applied to a substrate (e.g., an electrically conductive substrate). The articles formed from the blended particle composition, either alone or in combination with other components (e.g., electrically conductive substrates, separators or spacers in batteries, and so forth), may be then used in various settings, as an electrode article. The articles formed from the blended particle composition and optionally substrates onto which the articles are applied may be used to form an anode and/or a cathode. When the article is applied to a substrate, the article and substrate may include an adhesive.

In some embodiments, an electrode may include a composite sheet (or film) formed from filler particles (e.g., the filler particles discussed herein) and fibrillated and/or fibrillatable UHMWPE particles (e.g., the UHMWPE particles discussed herein). The composite sheet (in some embodiments, a self-supporting sheet or alternatively a composite sheet formed on a support substrate, e.g., via direct deposition) may have a thickness from about 10 microns to about 500 microns or greater. A method of making the electrode may include fibrillating UHMWPE particles having a molecular weight of at least 2,000,000 g/mol and a melt enthalpy of at least 190 J/g including dry blending (e.g., shearing) the UHMWPE particles with dry filler particles (including substantially dry filler particles) selected from at least one of carbon particles, conductive carbon particles, activated carbon particles, graphite, carbon black, and lithium compound particles (or any other additional filler particles, including those listed herein) to produce a dry blended product, and forming the dry blended product into a composite sheet (e.g., a self-supporting or non-self-supporting composite sheet) of the dry filler particles durably enmeshed in fibrillated UHMWPE, where the composite sheet is at least 90% by weight the dry filler particles and has a thickness from about 10 microns to about 500 microns.

The electrodes discussed herein may be implemented in an electrochemical energy storage device, the electrochemical energy storage device including at least a housing, an anode, a cathode, and an electrolyte (e.g., nonaqueous electrolyte), and in some embodiments a separator. The anode is positioned within the housing and may include a composite sheet formed of at least 90% by weight filler particles and 10% or less by weight binder particles. The filler particles and binder particles may be those discussed herein. In some embodiments, the anode binder particles may be fibrillated UHMWPE particles having a molecular weight of at least 2,000,000 g/mol and a melt enthalpy of at least 190 J/g as discussed herein, prior to submitting to the dry electrode process. A cathode is also positioned within the housing and may include a composite sheet formed of at least 90% by weight filler particles and 10% or less by weight binder particles. The cathode may be formed of filler and binder particles as discussed herein. In some embodiments, the cathode binder particles may be fibrillated UHMWPE particles having a molecular weight of at least 2,000,000 g/mol, a melt enthalpy of at least 190 J/g, and a bulk density from about 0.04 g/mL to 0.25 g/mL. Specific examples of electrodes are provided in the example section herein. The anode and/or the cathode may be coupled (e.g., adhered, deposited on, or otherwise applied) to a secondary substrate (e.g., an electrically conductive element). The electrodes discussed herein may be implemented on various types of batteries, including but not limited to lithium-ion batteries, lithium-sulfur batteries, sodium-ion batteries, and so forth. Although the examples included hereafter refer to half-cells (i.e., the cells using a lithium metal electrode in combination with one of the lithium-ion anodes or lithium-ion cathodes disclosed herein), it is understood that full cells may be formed using the electrodes disclosed herein as the anode, the cathode, or both.

Freeman Identification of Suitable UHMWPE Resin Particles Using Powder Rheology Testing In one embodiment, powder rheology testing (see methods section below) may be used to identify UHMWPE particles having suitable properties based on measure compressibility, cohesion, unconfined yield stress (UYS), and/or an angle of internal friction (AIF).

In one embodiment, a composition is provided comprising UHMWPE particles having a percent (%) compressibility of at least 20%, 30%, 40% or 50% at 15 kPa normal stress as measured using powder rheometer at 22° C.

In another embodiment, a composition is provided comprising UHMWPE particles having cohesion of at least 3 kPa, 4 kPa, or 5 kPa as measured using powder rheometer at 22° C.

In another embodiment, a composition is provided comprising UHMWPE particles having unconfined yield stress (UYS) of at least 10 kPa, 15 kPa or 20 kPa as measured using powder rheometer at 22° C.

In another embodiment, a composition is provided comprising UHMWPE particles having an angle of internal friction (AIF) of at least 25°, 30° or 35° as measured using powder rheometer at 22° C.

Powder rheology may also be used to identify suitable conditioned UHMWPE particles based on a percent change (relative to the near particles prior to conditioning) in the angle of internal friction (AIF), percent change of basic flowability energy (BFE), and/or a percent change of specific energy (SE).

In one embodiment, a composition is provided comprising conditioned UHWMPE particles having a percent change of angle of internal friction (AIF) relative to the preconditioned UHMWPE particles of at least 50%, 75%, 100%, 125%, 150%, 175%, or 200% as measured using powder rheometry at 22° C.

In another embodiment, a composition is provided comprising conditioned UHWMPE particles having a percent change of basic flowability energy (BFE) relative to the preconditioned UHMWPE particles of at least 10%, 20%, 30%, 40%, or 50%.

In another embodiment, a composition is provided comprising conditioned UHWMPE particles having a percent change of specific energy (SE) relative to the preconditioned UHMWPE particles of at least 20%, 30%, 40%, 50%, 60%, 70%, 80%, 90%, 100%, 110%, 120%, 130%, 140%, or 150%.

In one embodiment, the compositions comprising one or more of the above properties identified by powder rheology are suitable for use in a binder system. In another embodiment, the compositions comprising one or more of the above properties identified by powder rheology are suitable for use as a binder in the formation of an electrode, an anode or a cathode.

In another embodiment, a composite binder system is provided including the compositions comprising one or more of the properties identified herein by powder rheology and a plurality of filler particles. In another embodiment, an electrode is provided including the compositions comprising one or more of the properties identified herein by powder rheology and a plurality of filler particles. In a further embodiment, the composite binder system and/or the electrode includes a composite binder system where the composite binder comprises at least 95 wt % filler particles.

Identification of Suitable Binder Systems Using Capillary Rheology

In one embodiment, a capillary rheology assay (see below) may be used to identify suitable composite binder systems comprising filler particles and UHMWPE particles.

In one embodiment, a composite binder system is provided comprising filler particles and UHMWPE resin particles, the composite binder system having a force slope of at least 200 N/mm, 300 N/mm, 400 N/mm, 500 N/mm, 600 N/mm, 700 N/mm, 800 N/mm, 900 N/mm, or 1000 N/mm as measured by a capillary rheometer on a test sample under the following conditions:

1. Test sample is a uniform blend of 95 wt % filler particles and 5 wt % UHMWPE resin particles;
2. Barrel diameter of 12 mm and barrel length of 241.3 mm;
3. Maximum test load of 20 kN;
4. Temperature (barrel and die) of 130° C.;
5. Tape die reduction ratio of 2.5;
6. Piston velocity of 1 mm/s; and
7. Measuring normal force versus piston position and calculating the slope of the normal force and piston position line using the following equation for calculating slope;

$$m = (y_2 - y_1) \div (x_2 - x_1);$$

where, m=slope, $(x_1,y_1)$=coordinates of first point in the line of force (N) versus piston position (mm), $(x_2,y_2)$ =coordinates of second point in the line of force (N) versus piston position (mm); where the test sample is capable of forming a solid extrudate.

Ratio of UHMWPE Particle Size to Filler Particle Size in Preparing Suitable Composite Binder Systems In another aspect, suitable composite binder systems are prepared from UHMWPE resin particles and filler particles having similar particle sizes (median Da) that do not exceed a relative size ratio of more than 10:1.

In one embodiment, a composite binder system includes:

a plurality of filler particles characterized by a filler particle median Da; UHMWPE resin particles; said resin particles having:

a resin particle median Da;

a molecular weight of at least 2,000,000 g/mol;

a melt enthalpy of at least 190 J/g; and a bulk density of 0.04 g/mL to 0.25 g/mL;

where the ratio of the filler particle median Da to the resin particle median Da is from 10:1 to 1:10, 9:1 to 1:9, 8:1 to 1:8; 7:1 to 1:7; 6:1 to 1:6, 5:1 to 1:5, 4:1 to 1:4, 3:1 to 1:3, 2:1 to 1:2, and about 1:1.

Synthesis of Ultra-High Molecular Weight Polyethylene Resin Particles Having Low Chain Entanglement and Low Bulk Density Polyolefin catalyst systems used to produce highly disentangled (sometimes referred to as "weakly entangled") UHMWPE reactor fine powders are typically based on separating and/or reducing the density of the active sites, using a lower monomer concentration, adjusting the reaction medium, and/or reducing the reaction temperature.

These "single site" catalyst systems are designed to control the density and spacing of the active sites along with lower temperatures such that growing polymer chains are more likely to form ordered crystalline lamellae instead of chain entanglements. Typical examples of such catalyst systems include, but are not limited to metallocene, postmetallocene, and Fujita's catalysts (FI catalysts). The polyolefin catalyst systems often incorporate aluminoalkyl and/or aluminoalkyoxy cocatalysts. Examples of such catalysts system include $MgCl_2$-based heterogeneous Ziegler-Natta catalyst modified with polyhedral oligomeric silsesquioxane (4-OH POSS) (Guo et al., *Ind. Eng. Chem. Res.*, 2022, 61, 16711-16720), polyhedral oligomeric silsesquioxane (POSS)-modified $MgCl_2$-based Ziegler-Natta Catalyst (Chen et al., *Ind. Eng. Chem. Res.* 2021, 60, 3354-3362), FI catalysts such as bis(phenoxy-imine) and bis(phenoxy-ketimine) group 4 transition metal complexes where a heteroatom-coordinated early transition metal complex that combines a pair of nonsymmetric phenoxy-imine [O—, N] chelating ligands with a group 4 transition metal (Makio and Fujita, *Accounts of Chem. Res.* (2009) 42(10), 1532-1544).

The polyolefin catalyst system used to produce the present UHMWPE binder system should be designed to produce highly disentangled UHMWPE reactor fine powders having a low bulk density with a minimum crystalline lamellae thickness. In one aspect, the UHMWPE binder system includes UHMWPE particles having a bulk density from about 0.04 g/mL to about 0.25 g/mL, from about 0.04 g/mL to about 0.15 g/mL, from about 0.05 g/mL to about 0.12 g/mL, or from about 0.06 g/mL to about 0.08 g/mL. In a further aspect, the binder system includes UHMWPE particles having:

a molecular weight of at least 2,000,000 g/mol or at least 3,000,000 g/mol, or at least 4,000,000 g/mol, or at least 5,000,000 g/mol, or at least 6,000,000 g/mol, or at least 7,000,000 g/mol;

a first melt enthalpy greater than about 190 J/g, about 195 J/g, about 200 J/g, about 205 J/g, about 210 J/g, about 215 J/g, about 220 J/g, about 225 J/g, about 230 J/g, about 235 J/g, about 245 J/g, about 250 J/g, about 255 J/g, about 260 J/g, about 265 J/g, about 270 J/g, or about 275 J/g; and a bulk density of about 0.04 g/mL to about 0.25 g/mL, about 0.04 g/mL to about 0.15 g/mL, about 0.05 g/mL to about 0.12 g/mL, or about 0.06 g/mL to about 0.08 g/mL.

In one embodiment, the polyolefin catalyst system includes a solid catalyst support. In one embodiment, the polyolefin catalyst system includes a polyolefin catalyst support in the form of fine particles (see U.S. Pat. No. 9,181,359 B2 to Nishio et al.). In some embodiments, the catalyst support includes fine catalyst support particles having an average particle size of about 1 nm to 300 nm. In another embodiment, the use of fine particles as a polyolefin catalyst support may be used with a variety of single site catalysts capable for producing weakly entangled UHMWPE resin particles (for example, metallocene, postmetallocene, FI catalysts, and modified Ziegler-Natta catalyst systems including, but not limited to polyhedral oligomeric silsesquioxane (POSS)-modified $MgCl_2$-based Ziegler-Natta Catalyst). In some embodiments, the method of producing the present UHMWPE resin powders (neat) is prepared using a catalyst support in the form of fine particles according to U.S. Pat. No. 9,181,359 B2 to Nishio et al.

For this invention, it is also desirable that particle morphology be such so as to reduce the level of connections created during the production of the polymer. These connections could be either entanglements or crystalline connections between what were separately grown crystals that came into contact with each other. A low bulk density of the polymer is an indicator of having the desired gaps between the individual polymer crystallites.

The selection of the catalysts system is not limiting as long as the polymer particles have the has the required characteristics described herein.

It is to be understood that the composite materials and articles formed therefrom may also be implemented in a variety of other systems, for example, supercapacitors, and therefore are not intended to be limited exclusively to any of the specific example provided herein.

Test Methods

Contact Thickness Measurements

Thickness was measured using a hand actuated Mitutoyo thickness gauge (Mitutoyo Corporation, Kawasaki, Japan) with 6.3 mm metal plates.

Tensile Strength

The process described in ASTM D638-5 was used to determine tensile strength. Unless otherwise specified, tensile strength described herein is reported as an engineering stress (i.e., force normalized by the initial cross-sectional area of the sample).

Particle Size and Shape

Particle size distribution measurements were carried out on a Microtrac Series 5000-3L Sync particle size and shape analysis system which combines laser diffraction with dynamic image analysis (Microtrac MRB, York PA, USA). The instrument is controlled using the Microtrac FLEX 12 software (Microtrac) using default parameters unless otherwise specified. This instrument uses a combination of two techniques into a single instrument. Laser diffraction analysis is carried out using the scattered light from multiple lasers through a stream of suspended particles. Dynamic image analysis is also performed on the particle stream using a high-speed, high-resolution camera.

The sample is prepared as follows: Approximately 0.5 grams of sample powder were placed into a vial and dispersed using several milliliters of reagent grade isopropyl alcohol, IPA, (Sigma Aldrich, St Louis MO, USA). The use of an ultrasonic horn was used to aid in breaking up any agglomerates of particles in the sample (Qsonica, Newtown CT, USA). If the suspension remains stable to precipitation, it can be used for analysis as is. Otherwise, the addition of a small amount of appropriate surfactant may be needed.

The testing procedure is generalized as follows: (1) after filling the Sync instrument with fresh IPA, the Sync transducer was zero'ed using the SetZero procedure; (2) once zero'ed, the "Sample loading" procedure was initiated and the sample suspension was added dropwise to the instrument reservoir until the light transmission measured by the Sync was within the acceptable range, typically 88-90% T; (3) optical parameters for the particle and solvent (refractive indices, etc.) were input for subsequent calculations; and (4) the data collection was then initiated using the FLEX software.

The particle size analysis is performed by the software once it collects and averages the scattered light. Particle size distributions are calculated using Mie scattering theory and tabulated on a volume basis. Various ways to analyze the data are provided including the usual particle size distribution plot, cumulative distribution plot, percentiles, and other moments of the distribution.

Particle shape analysis is performed over many images (typically on the order of 100,000). In addition to the raw images, there are approximately 20 descriptors that are used to quantify the distribution of shapes. These include parameters that describe the circularity, form, roughness, and geometry classes and are tabulated on a number basis.

The Da (area equivalent diameter) corresponds to a diameter of a circle equal to that of the area the of particle image. The median Da (or D50 Da) for a given particle distribution corresponds to the value of Da at which 50% of the particles have a smaller Da and 50% have a larger Da within that population.

DSC Measurements

Differential Scanning calorimetry (DSC) data was collected using a TA Instruments Discovery DSC (TA Instruments, New Caste, DE) between either −50° C. or 35° C. and 200° C. using a heating rate of 10° C./min. For resins samples, approximately 5 mg of powder was placed into a standard pan-and-lid combination available from TA instruments. The samples were prepared by punching 4 mm disks. The 4 mm disk was placed flat in the pan and the lid was crimped to sandwich the composite sheet disk between the pan and lid. A linear integration scheme from 100° C. to 175° C. was used to integrate the melting enthalpy data. Subsequent de-convolution of the melting region was accomplished using the PeakFit software from SeaSolve Software (PeakFit v4.12 for Windows, Copyright 2003, SeaSolve Software Inc.). Standard conditions were used to fit a baseline (after inverting the data to generate "positive" peaks) and subsequently resolve the observed data into its individual melting components.

Freeman FT4 Powder Rheology Testing

Powder properties are critical material attributes that affect powder processing and therefore the quality of the final product. For the evaluation of our PE resins and filler powders, Freeman FT4 powder rheometer (Freeman Technology, UK) was used to perform (1) Compressibility test (2) Dynamic test and (2) Shear test at room temperature (approximately 22° C.). Before the actual test, powder conditioning process was performed which includes of a traverse of a blade downward and then a traverse upward. This process removes any packing history such as pre-consolidation or excess air. All the tests on FT4 powder rheometer were performed at room temperature. The results of the powder rheology testing are shown in Example 14. Definitions of the Terms Used to Describe Powder Rheology Results Bulk density: It is measured in terms of grams per cubic centimeter (g/mL) is mass per unit volume of sample tested.

Compressibility: % change in volume after compression measured in terms of %.

Basic Flowability Energy (BFE): This is the amount of energy (work done) required to move the rotating blade through the bed of the sample powder from top of the sample vessel to the bottom, i.e., during downward traverse. BFE is measured in terms of millijoules (mJ).

Specific Energy (SE): This is the amount of energy (work done) required to move the rotating blade through the bed of the sample powder from bottom of the sample vessel to the top, i.e., during upward travers. It is then normalized against sample mass. SE is measured in terms of millijoules per gram (mJ/g).

Cohesion: It is the shear stress required to break (yield) the sample at 0 normal stress measured in shear testing. Cohesion is defined in terms of kilopascal (kPa).

Unconfined Yield Stress (UYS): It is normal stress required to break unconfined powder sample at 0 shear stress measured in shear testing. UYS is defined in terms of kilopascal (kPa).

Angle of Internal Friction (AIF): In the shear testing, shear stress values are measured at various normal stress levels. Typically shear stress values keep increasing with increase in normal stress on sample. AIF is angle created by line of shear stress values on Y-axis versus normal stresses on X-axis in the shear testing. AIF is defined in terms of degrees (°).

Compressibility Test

The standard measurement of compressibility measurement of Freeman FT4 was utilized to measure compressibility of polyethylene resin powders. This test method also generated bulk density values. Compressibility and density data is reported in Example 14. In this test a vented piston was utilized to compress the sample under increasing normal stress. The powder samples were first pre-conditioned to remove any compaction in the powder. The vented piston used in this test is designed such that the compression face is constructed from a woven stainless-steel mesh and allows the entrained air in the powder to escape uniformly across the surface of the powder bed. Each normal stress is applied for a defined time to allow the powder to reach equilibrium. The distance travelled by the piston was measured for each applied normal stress and the compressibility was calculated as a percentage change in volume. The compressibility test was performed using 50 mm inside diameter sample vessel with 85 ml volume capacity.

Dynamic Testing to Measure Basic Flowability Energy (BFE) and Specific Energy (SE)

Figure 6:
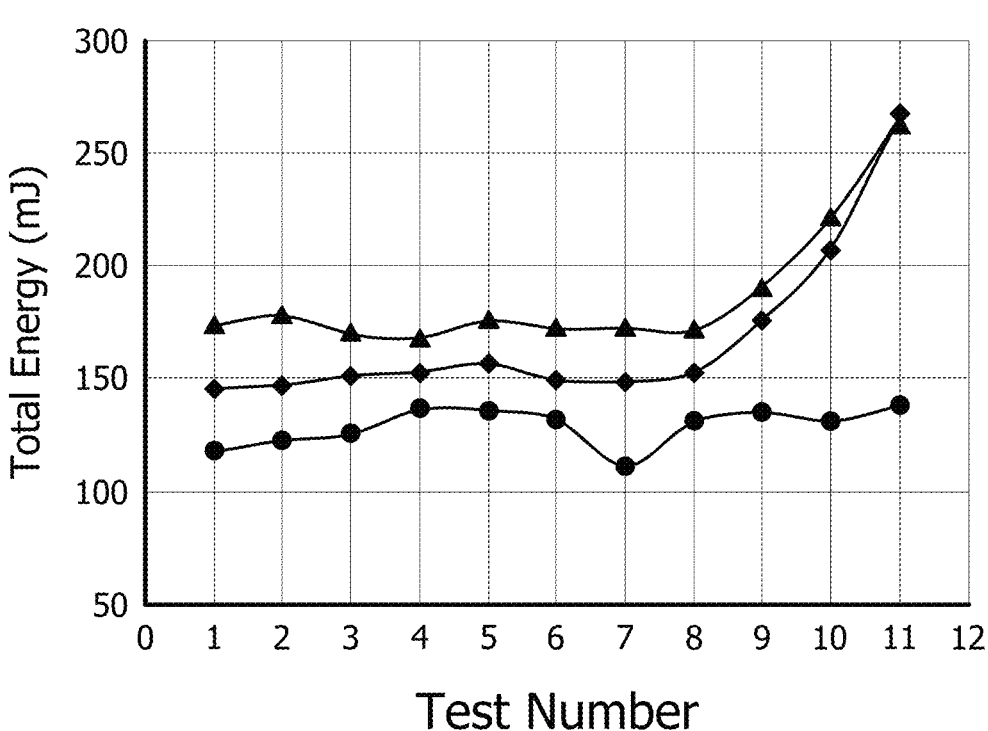
FIG. 6 is a graphical illustration of Freeman FT4 powder rheometer dynamic testing data for Resin A and Resin A Conditioned in accordance with embodiments described herein.
Figure 7:
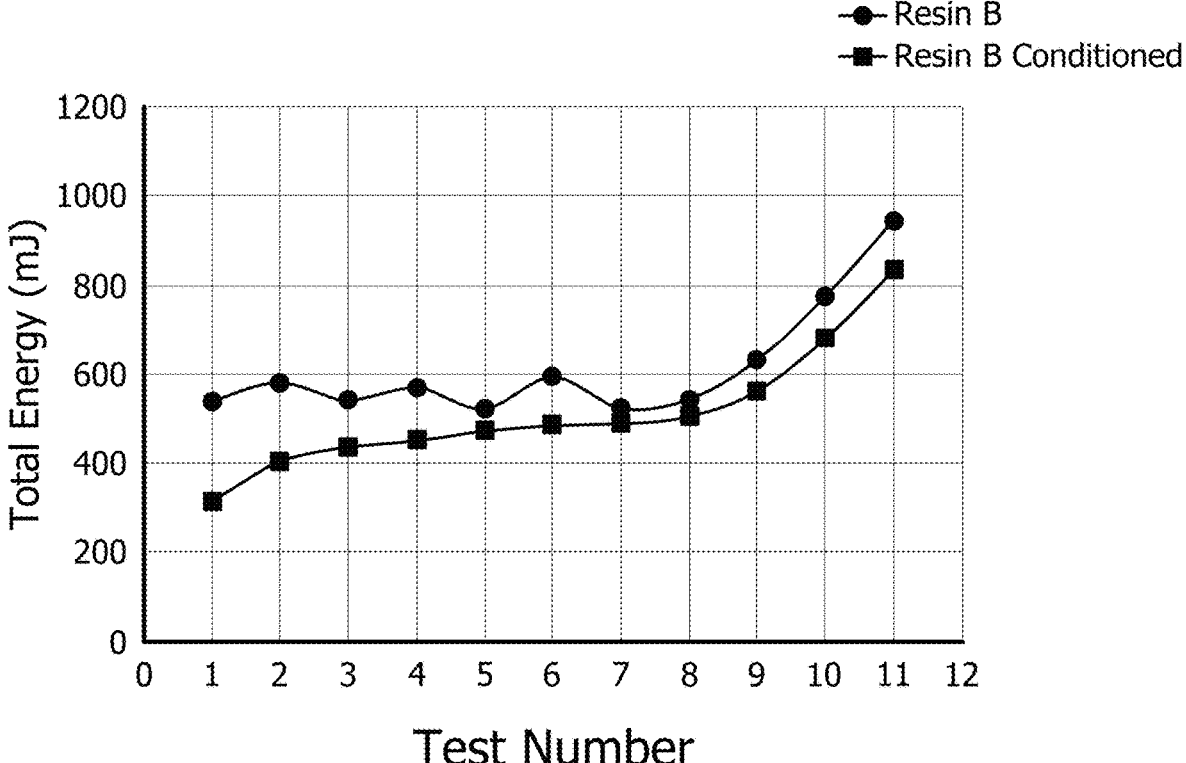
FIG. 7 is a graphical illustration of Freeman FT4 powder rheometer dynamic testing data for Resin B and Resin B Conditioned in accordance with embodiments described herein.

Dynamic testing was performed using 48 mm diameter blade, 50 mm internal diameter, and a 160 mL powder sample vessel. Before the actual test powder conditioning process was performed which includes a traverse of a blade downward and then a traverse upward. This process removes any packing history such as pre-consolidation or excess air. The result from the test is a single flow energy value which represents the resistance to flow in this downward flow mode which is called the Basic Flowability Energy (BFE). BFE is measured in terms of mJ. During this test, the flow pattern is a downward anti-clockwise motion of the blade, generating a compressive, relatively high stress flow mode in the powder. The BFE is calculated from the work done in moving the blade through the powder from the top of the vessel to the bottom. Another material property that was obtained in the dynamic testing was Specific Energy (SE) which is calculated from the work done in moving the rotating blade through the bed of the sample powder from bottom of the vessel to the top divided by mass of the sample. SE is measured in terms of mJ/g. The tip speed of the moving blade was at 100 mm/s. The rotating blade has helix angle of 5°. The same test was repeated 8 times at 100 mm/s tip seed to know effect of repeating the test on resin sample. After the 8th test, the last three tests were conducted at the speed of 70, 40, and 10 mm/s respectively to understand response of material at lower blade tip speed. FIG. 6 shows total energy measured in mJ during dynamic testing of Resin A and Conditioned Resin A. FIG. 7 depicts dynamic testing results for Resin B and Conditioned Resin B. Table 17 in Example 14 shows BFE and SE values for UHMWPE resin powder samples.

Shear Testing

Figure 8:
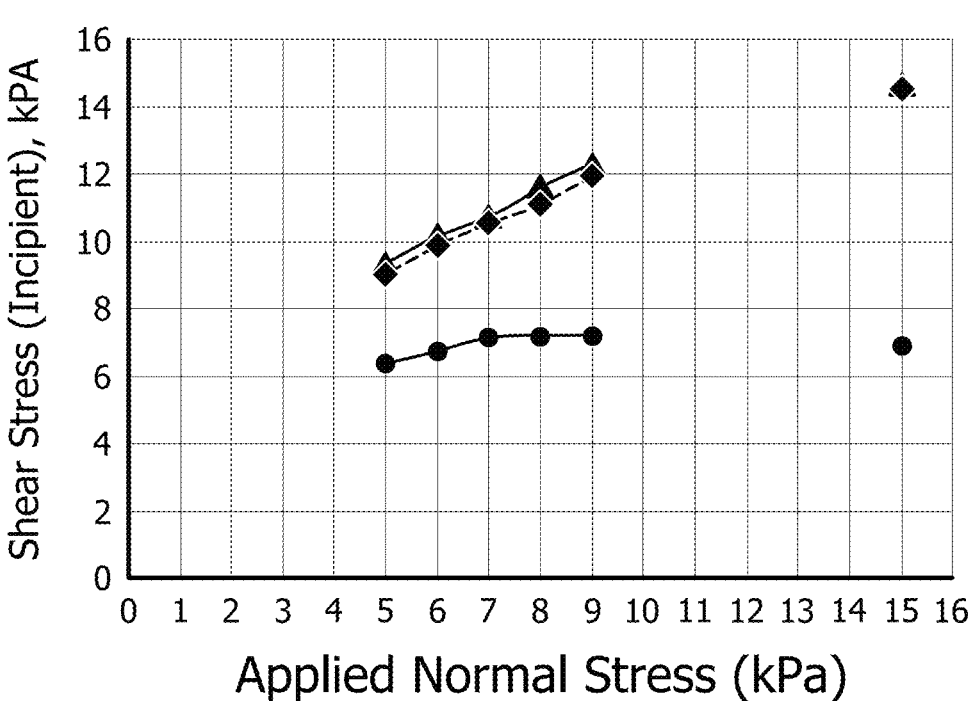
FIG. 8 is a graphical illustration of Freeman FT4 powder rheometer shear testing data for Resin A and Resin A Conditioned in accordance with embodiments described herein.
Figure 9:
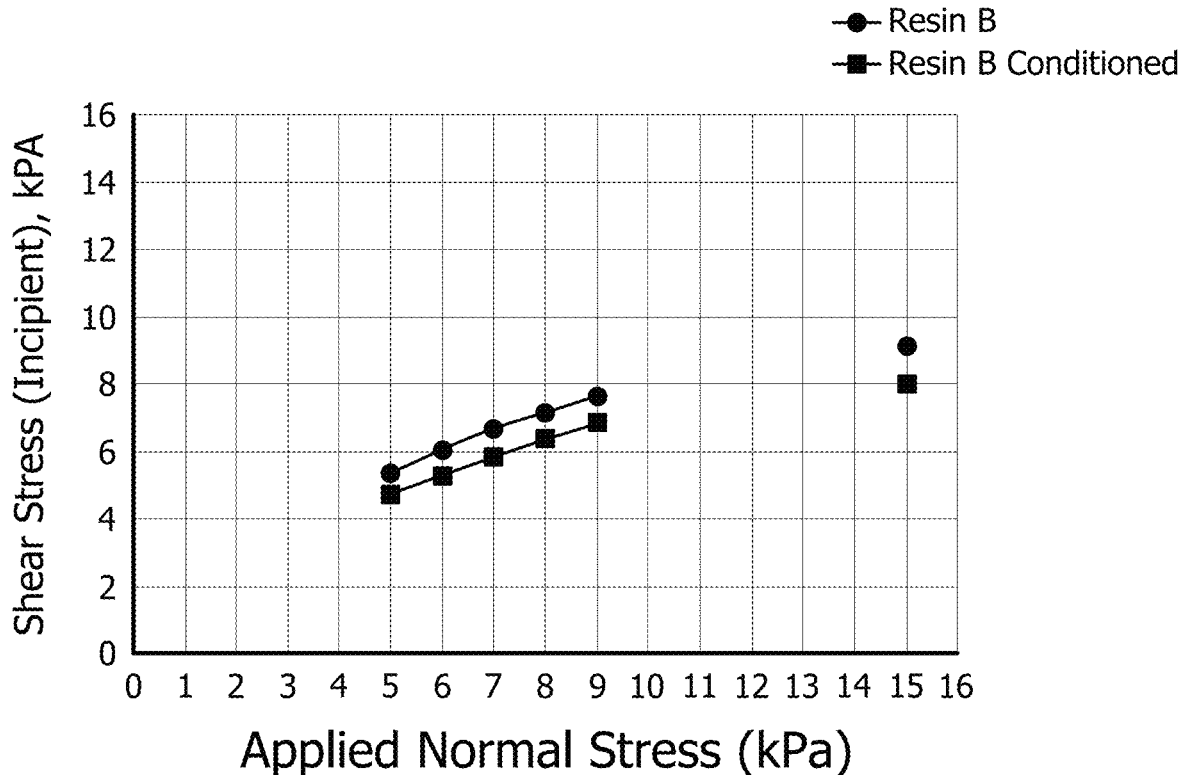
FIG. 9 is a graphical illustration of Freeman FT4 powder rheometer shear testing data for Resin B and Resin B Conditioned in accordance with embodiments described herein.

The shear testing was performed using 48 mm blade, 50 mm diameter and 85 mL sample vessel. The shear testing on FT4 rheometer consists of a vessel to put the powder sample and a shear head to induce both vertical and rotational stresses. During the test, the shear head moves downwards inserting the blades into the powder and induces a normal stress as the shear head face contacts the top of the powder. The sheer head continues to move downwards until the required normal stress, s is established. Slow rotation of the shear head then begins, inducing shear t. A shear plane is established just below the ends of the blade. As the powder bed resists the rotation of the shear head the shear stress increases until the bed fails or shears, at which time a maximum shear stress is observed. The normal stress is maintained constant throughout the shear step. The shear rate of 18°/min was used for all the shear testing. This maximum shear is the Yield Point recorded. In the shear testing, powder was pre-conditioned to remove any pre-consolidation in the posers. The shear stress values for the powder samples were measured at 5, 6, 7, 8, 9, and 15 kPa of normal stress values. FIG. 8 shows the yield loci for Resin A and Conditioned Resin A powder samples. FIG. 9 shows the yield loci for Resin B and Conditioned Resin B powder samples. The results of shear testing are discussed in Example 14.

Capillary Rheology Testing

Rheological testing on dry mixture (filler particles+ UHMWPE resin powders) and UHMWPE resin powders was performed on GÖTTFERT capillary rheometer (GÖTTFERT Werkstoff-Prüfmaschinen, GmbH, Siemensstraße 2, 74722 Buchen, Germany) with test load of 20 kN. The barrel size of 12 mm in diameter and 241.3 mm in length was used. A flat tape die with reduction ratio (smallest cross-sectional area of die divided by the cross-sectional area of barrel) of 2.5 was used for the experiments. Normal force data was collected at piston velocity of 1 mm/s. For all the experiments piston speed of 1 mm/s was used. The experiments were conducted at two set temperatures of die and barrel, 125° C. and 130° C. of die and barrel. During the testing, dry powder samples were loaded into the barrel of the capillary rheometer ensuring there were no air bubbles or voids in the material. Before the actual run, the open end of the barrel was locked, and 500 N force was applied to compact the powder sample in the barrel.

After compacting the powder, compaction force was removed, and powder sample was allowed to sit in the barrel for 5 minutes to ensure it reaches uniform temperature. The locking bolt was replaced by the die to start the actual test. Normal force data and piston position data was collected in the rheometer software during the test. Along with recording piston force and position data, visual observations were made to assess the quality of the extrudates. Typically, when piston starts moving in the barrel and starts compacting the powder sample in the barrel, required force to push the material out of the die keeps going up and as soon as the material comes out of the die the normal force goes down with advancing piston position. The force and piston position data was collected for all the tested samples. The slope of the force versus piston position data was calculated for all the samples in Microsoft Excel (Microsoft Corp., Redmond, WA) using a linear trendline (y=mx+b) where m=slope, x=piston position, b=intercept, and y=normal force; where:

$$m = (y_2 - y_1) \div (x_2 - x_1)$$

$(x_1, y_1)$=coordinates of first point in the line of force (N) versus piston position (mm); and $(x_2, y_2)$=coordinates of second point in the line of force (N) versus piston position (mm).

Figure 10:
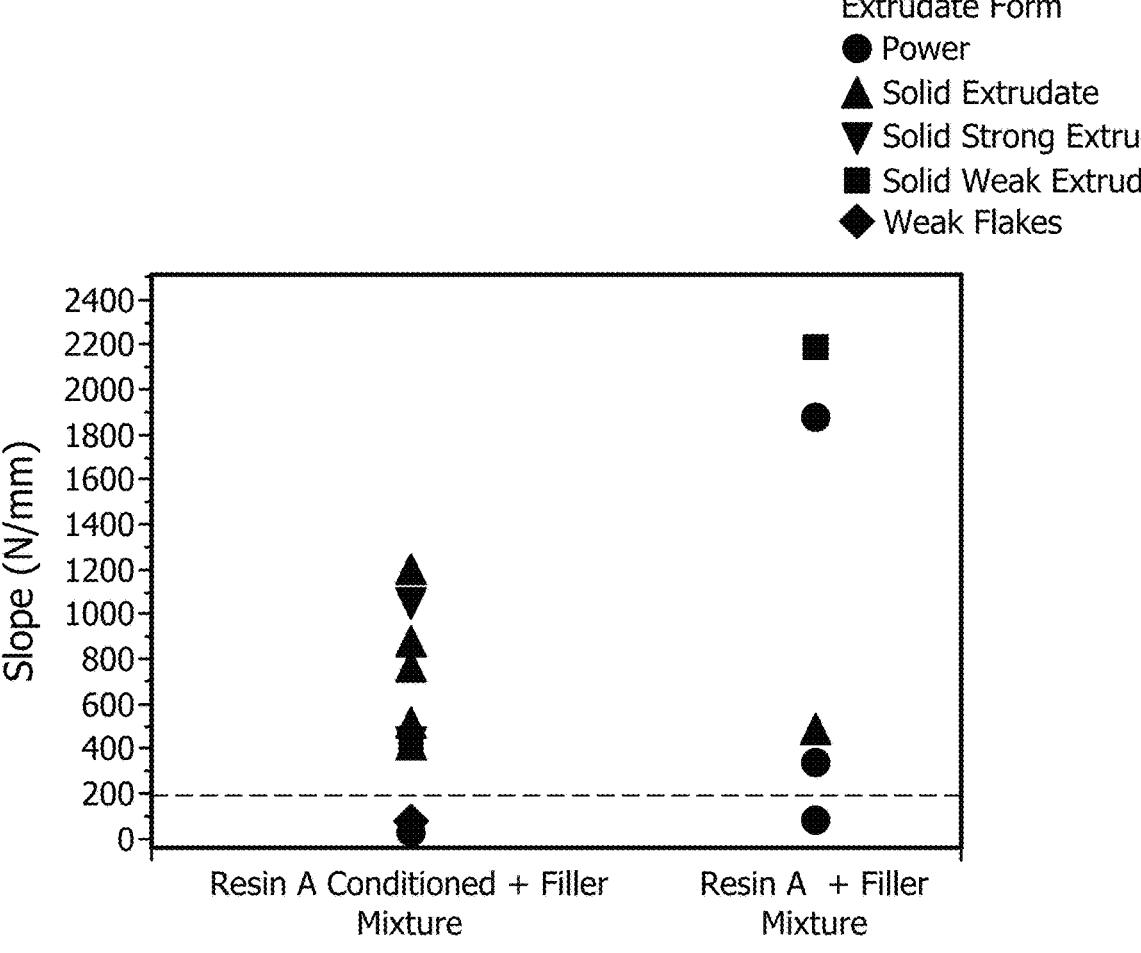
FIG. 10 is a graphical illustration of capillary rheometer data of slope (N/mm) values for of Resin A and Filler Mixture and Resin A Conditioned and Filler Mixture.

Example 15 shows capillary rheology data for the tested samples. FIG. 10 shows slope (N/mm) data for Resin A+Filler Mixture and Resin A Conditioned+Filler Mixture.

EXAMPLES

In the Examples, the following nomenclature is utilized:

Resin A is an ultrahigh molecular weight polyethylene (UHMWPE) resin having a molecular weight of at least 2,000,000 g/mol, a melt enthalpy of at least 190 J/g, and a bulk density from about 0.04 g/mL to about 0.25 g/mL.

Resin A conditioned is Resin A in which the size and shape of the polyethylene Resin A particles has been modified to a median Da from about 5 to 300 microns.

Resin B is an ultrahigh molecular weight polyethylene (UHMWPE) resin having a molecular weight of at least 1,800,000 g/mol, a melt enthalpy of 200 J/g and a bulk density of about 0.43 g/mL and is commercially available as PM-200 from Mitsui Chemicals, Inc (Tokyo, JP).

Resin B conditioned is Resin B in which the size and shape of the UHMWPE Resin B particles has been modified so as to have a median Da from about 5 microns to about 20 microns.

Example 1

Lithium-Ion Battery Anode Produced with an Unconditioned Resin A

A composite blend of 95.15 wt % graphite (commercially available from Superior Graphite, Chicago, Illinois, USA), 1.5 wt % carbon black (commercially available from Imerys S.A., Bironica, Switzerland), and 3.35 wt % Resin A was blended with shear mixing in a manner generally taught in U.S. Patent Publication No. 2005/0057888 to Mitchell, et al., published Mar. 17, 2005. The resulting freestanding, porous fibrillated UHMWPE composite sheet included the above fillers durably enmeshed within the UHMWPE fibrillated microstructure. The composite sheet had a thickness of 140 microns, a mass per area of 216 g/m², an envelope density of 1.54 g/cm³, and a tensile stress at maximum (max) load of about 380 kPa (ASTM D638-5 Rev 8). This composite sheet was designated as Sample 1. Table 1 sets forth properties of Resin A used to prepare Sample 1 and properties of the composite sheet Sample 1. Table 2 includes DSC peak integration data for Sample 1.

TABLE 1

Summary Table of Resin A Properties and Composite Sheet Properties

| | Resin A Properties | | | | Composite Sheet Properties | | |
| | | | | | Tensile | | |
| Sample | Median Da, microns | Median Sphericity (scale 0 to 1) | Median Convexity (Scale 0 to 1) | Median L/W Ratio | stress at max load, kPa | Tensile strain at max load, % | Tensile strain at break, % |
|---|---|---|---|---|---|---|---|
| 1 | 314.5 | 0.804 | 0.925 | 1.72 | 379.2 | 3.1 | 47.8 |
| 2 | 27.8 | 0.848 | 0.978 | 1.67 | 4,444.4 | 7.1 | 20.9 |
| 3 | 26.2 | 0.848 | 0.979 | 1.68 | 6,579.0 | 8.6 | 9.3 |
| 4 | 58.6 | 0.830 | 0.959 | 1.60 | 2,487.0 | 4.4 | 37.1 |
| 5 | 27.8 | 0.848 | 0.978 | 1.67 | 5,722.7 | 6.0 | 11.1 |
| 6 | 27.8 | 0.848 | 0.978 | 1.67 | 6,330.8 | 5.2 | 5.7 |
| 7 | 58.6 | 0.830 | 0.959 | 1.60 | 2,955.8 | 3.9 | 32.9 |

TABLE 2

Summary Table of Results of DSC Peak Integration for Composite Sheets

| Sample | Total Area (J/g) 100° C. to 175° C. | Partial Area 1 (J/g) 100° C. to 143° C. | Partial Area 2 (J/g) 143° C. to 175° C. | Normalized Partial Area 1 (% of total area) 100° C. to 143° C. as percentage of 100° C. to 175° C. | Normalized Partial Area 2 (% of total area) 143° C. to 175° C. as percentage of 100° C. to 175° C. |
|---|---|---|---|---|---|
| 1 | 4.001 | 3.068 | 0.9331 | 77% | 23% |
| 2 | 4.111 | 1.814 | 2.297 | 44% | 56% |
| 3 | 3.971 | 1.821 | 2.150 | 46% | 54% |
| 4 | 3.951 | 1.564 | 2.387 | 40% | 60% |
| 5 | 4.077 | 1.574 | 2.504 | 39% | 61% |
| 6 | 3.778 | 2.718 | 1.060 | 72% | 28% |
| 7 | 3.768 | 2.279 | 1.489 | 60% | 40% |

Example 2

Lithium-Ion Battery Anode Produced with Conditioned Resin A

Prior to blending with graphite, Resin A was conditioned by applying shear to alter the size and shape of the resin. Next, composite blends of 95.15 wt % graphite (Superior Graphite, supra), 1.5 wt % carbon black (Imerys S.A., supra), and 3.35 wt % Resin A conditioned were blended with shear mixing in a manner generally taught in U.S. Patent Publication No. 2005/0057888 to Mitchell, et al., published Mar. 17, 2005. The resulting freestanding, porous fibrillated UHMWPE composite sheet included the above fillers durably enmeshed within the fibrillated UHMWPE microstructure. A total of six composite sheet samples were produced by this process (i.e., conditioning Resin A, and producing a composite sheet from the Conditioned Resin A). These samples were designated as Samples 2-7. Table 1 provides properties of Resin A and Resin A Conditioned used to prepare Samples 2-7 and of the composite sheet Samples 2-7. Table 2 includes DSC peak integration data for Samples 2-7.

For half-cell assembly, five of the 15.6 mm diameter discs were punched from each of Samples 2, 3, and 4 (resulting in a total of 15 punched discs). These discs were designated as samples 2A-2E, 3A-3E, and 4A-4E, respectively. Samples 2A-2E had an average mass-per-area of 214 g/m² and an average thickness of 135 microns, resulting in an envelope density of 1.59 g/cm³. Samples 3A-3E had an average mass-per-area of 216 g/m² and an average thickness of 131 microns, resulting in an envelope density of 1.65 g/cm³.

Samples 4A-4E had an average mass-per-area of 226 g/m² and an average thickness of 142 microns, resulting in an envelope density of 1.59 g/cm³.

Example 3

Lithium-Ion Battery Cathode Produced with Conditioned Resin A

Prior to blending with graphite, Resin A was conditioned by applying shear to alter the size and shape of resin. The size and shape data is shown in Table 1. Next, a composite blend of 94.3 wt % Lithium Nickel Manganese Cobalt Oxide NMC-111 ($Li_{1.05}Ni_{0.33}Mn_{0.33}Co_{0.33}O_2$; commercially available from MSE Supplies LLC, Tucson AZ), 1.5 wt % carbon black (Imerys S.A., supra; C65), 2.5 wt % graphite (Imerys S.A., supra; SFG6-L), 1.6 wt % Resin A Conditioned was blended with shear in a manner generally taught in U.S. Patent Publication No. 2005/0057888 to Mitchell, et al. to produce freestanding cathodes with a thickness ranging from 145 microns-160 microns. The resulting freestanding, porous fibrillated UHMWPE composite sheet included the above fillers durably enmeshed within the fibrillated matrix. The porous fibrillated UHMWPE composite sheet had a thickness of 151 microns, a mass per area of 501 g/m², and a bulk density of 3.30 g/cm³. This composite sheet was designated as Sample 8.

For half-cell assembly, five of the 15.6 mm diameter discs were punched from Sample 8. These discs were designated as samples 8A-8E. Samples 8A-8E had an average mass-per-area of 501 g/m² and an average thickness of 151 microns, resulting in an average envelope density of 3.31 g/cm³.

Comparative Example 1

Control Lithium-Ion Battery Anode Preparation

The control lithium-ion battery anode composition was as follows (in dry mass fractions):

94% Superior GraphiteSLC1520T graphite commercially available from Superior Graphite, United States.

1.5% C65 carbon black commercially available from Imerys S.A., Belgium.

1.5% BH1000 NaCMC (NaCMC=sodium carboxymethyl cellulose) commercially available from Wealthy Chemical Industry (Suzhou) CO, Ltd., Jiangsu, China.

3% Styrene butadiene rubber (SBR), commercially available from MTI Corp., Richmond, CA.

The nominal intrinsic densities (or skeletal densities) of these materials are shown in Table 3. Using these values, mass fractions can be readily converted to volume fractions, and electrode porosity can be readily calculated without undue burden by one of ordinary skill in the art. The properties of the produced lithium-ion battery anodes are shown in Table 4.

TABLE 3

Properties of Anode Raw Materials

| Material | Density g/cm³ | Mass Fraction wt % | Mass-per-Area g/m² | Skeletal Volume-per-Area cm³/m² | Skeletal Volume Fraction vol % |
|---|---|---|---|---|---|
| Graphite | 2.20 | 94.0% | 180 | 82.0 | 92.1% |
| Carbon Black | 1.79 | 1.5% | 3 | 1.6 | 1.8% |
| NaCMC | 1.78 | 1.5% | 3 | 1.6 | 1.8% |
| SBR | 1.50 | 3.0% | 6 | 3.8 | 4.3% |
| Total | | 100.0% | 192 | 89.1 | 100.0% |

TABLE 4

Properties of Produced Lithium-Ion Battery Anode

| | | |
|---|---|---|
| Foil Thickness | Microns | 10 |
| Initial Thickness (with foil) | Microns | 191 |
| Final Thickness (with foil) | Microns | 128 |
| Initial Thickness (no foil) | Microns | 181 |
| Final Thickness (no foil) | Microns | 118 |
| Initial Porosity | vol % | 51% |
| Final Porosity | vol % | 24% |
| Initial Coating Density | g/cm³ | 1.06 |
| Final Coating Density | g/cm³ | 1.63 |

Control lithium-ion battery anodes were prepared according to the following steps:

a) Dissolved NaCMC in deionized (DI) water and allowed to equilibrate overnight (about 14-18 hours)

b) Dispersed C65 using 1.5" diameter Cowles blade at 2000 rotations per minute (RPM)

c) Dispersed SLC1520T graphite using 1.5" diameter Cowles blade at 2000 RPM d) Diluted with DI water as needed to adjust viscosity to maintain a vortex for efficient mixing e) Blended in SBR using 1.5" diameter Cowles blade at 1000 RPM f) Cast via doctor blade on 10 µm copper foil g) Dried at 35° C. in air on a large hot plate h) To remove any residual solvent, transferred air-dried electrodes to vacuum oven, dried overnight at 110° C. under vacuum i) Punched a 1" diameter piece of electrode, weighed it to determine the mass-per-area of the active layer (must subtract mass of the foil substrate)

j) Used a drop micrometer to measure the thickness of the 1" diameter electrode to determine the thickness of the active layer (must subtract thickness of the foil substrate), and calendered it so the active layer achieves a density of about 1.6 g/cc The sheet of coated and dried control lithium-ion battery anode (corresponding to the material at the end of step (h) above) is designated as Sample 9. The cut and calendered samples (corresponding to the end of step (j) above) are designated Samples 9A-9E. The control lithium-ion battery anodes had an average mass-per-area (not including foil) of 19.2 mg/cm². The nominal foil thickness was 10 microns. The average initial electrode thickness (with foil, before calendering) was 191 microns. The average final electrode thickness (with foil, after calendering) was 128 microns, corresponding to an average density of 1.63 g/cc, and an average porosity of 24%. Note that the electrode density is a so-called "envelope" density that is calculated by dividing the mass-per-area of the active layer by the thickness of the active layer.

Comparative Example 2

Control Lithium-Ion Battery Cathode Preparation

The control lithium-ion battery cathode composition was as follows (in dry mass fractions):

93% NCM-111 (NCM-111 is $Li_{1.05}Ni_{0.33}Mn_{0.33}Co_{0.33}O_2$) from MSE Supplies LLC, Tucson, AZ, USA.

3% Kynar® HSV-900 PVDF (polyvinylidene fluoride); Arkema inc., King of Prussia, PA, USA 1.5% C65 carbon black from Imerys S.A., Belgium 2.5% SFG6-L conductive graphite Imerys S.A., Belgium The nominal intrinsic densities (or skeletal densities) of these materials are shown in Table 5. Using these values, mass fractions can be readily converted to volume fractions, and electrode porosity can be readily calculated, by one of ordinary skill in the art. The properties of the produced lithium-ion battery cathodes are shown in Table 6.

TABLE 5

Properties of Lithium-Ion Battery Cathode Raw Materials

| Material | Skeletal Density g/cm³ | Mass Fraction wt % | Mass-per-Area g/m² | Skeletal Volume-per-Area cm³/m² | Skeletal Volume Fraction vol % |
|---|---|---|---|---|---|
| NMC-111 | 4.80 | 93.0% | 405 | 84.5 | 83.1% |
| PVDF | 1.75 | 3.0% | 13 | 7.5 | 7.3% |

TABLE 5-continued

Properties of Lithium-Ion Battery Cathode Raw Materials

| Material | Skeletal Density g/cm³ | Mass Fraction wt % | Mass-per-Area g/m² | Skeletal Volume-per-Area cm³/m² | Skeletal Volume Fraction vol % |
|---|---|---|---|---|---|
| C65 Carbon Black | 1.79 | 1.5% | 7 | 3.7 | 3.6% |
| SFG6 Graphite | 1.79 | 2.5% | 11 | 6.1 | 6.0% |
| Total | | 100.0% | 436 | 101.7 | 100.0% |

TABLE 6

Properties of Produced Lithium-Ion Battery Cathode

| | | |
|---|---|---|
| Foil Thickness | Microns | 15 |
| Initial Thickness (with foil) | Microns | 210 |
| Final Thickness (with foil) | Microns | 162 |
| Initial Coating Thickness (no foil) | Microns | 195 |
| Final Coating Thickness (no foil) | Microns | 147 |
| Initial Coating Porosity | vol % | 48% |
| Final Coating Porosity | vol % | 31% |
| Initial Coating Density | g/cm³ | 2.24 |
| Final Coating Density | g/cm³ | 2.97 |

Control cathodes were prepared according to the following steps:

a) All mixing steps were carried out under argon blanket
b) Dissolved PVDF in dry NMP (NMP is N-methylpyrrolidone)
c) Dispersed C65 using 1.5" diameter Cowles blade at 2000 RPM
d) Dispersed SFG6-L conductive graphite using 1.5" diameter Cowles blade at 2000 RPM
e) Dispersed NCM-111 using 1.5" diameter Cowles blade at 2000 RPM
f) Diluted with dry NMP as needed
g) Cast via doctor blade on 15 μm aluminum foil
h) Dried at 80° C. in air on a large hot plate
i) To remove any residual solvent, transferred air-dried electrodes to vacuum oven, dried overnight at 110° C. under vacuum
j) Punched a 1" diameter piece of electrode, weighed it to determine the mass-per-area of the active layer (must subtract mass of the foil substrate)
k) Used a drop micrometer to measure the thickness of the 1" diameter electrode to determine the thickness of the active layer (must subtract thickness of the foil substrate), and calendered it so the active layer achieved a density of about 3.0 g/cc The sheet of coated and dried control lithium-ion battery cathode (corresponding to the material at the end of step (i) above, is designated as Sample 10. The cut and calendered samples (corresponding to the end of step (k) above) are designated Samples 10A-10D. The control lithium-ion battery cathodes had an average mass-per-area (not including foil) of 43.6 mg/cm². The nominal foil thickness was 15 microns. The average initial electrode thickness (with foil, before calendering) was 210 microns. The average final electrode thickness (with foil, after calendering) was 162 microns, corresponding to an average envelope density of 2.97 g/cc and an average porosity of 31%. Note that the electrode density is a so-called "envelope" density that is calculated by dividing the mass-per-area of the active layer by the thickness of the active layer.

Example 6

Half-Cell Assembly

Samples of lithium-ion battery anodes and lithium-ion battery cathodes were tested as half-cells 10 in standard 2032 cell hardware. Each half-cell shown in FIG. 1) included a housing 12 including a positive can 14 and a negative can 16. The half-cell 10 also included a conical spring 18, a spacer 20, a separator 22, and electrolyte 24, and a lithium disc 26. Each half-cell 10 included either a lithium-ion battery anode or a lithium-ion battery cathode as the positive electrode 100. For all half-cells 10, the lithium disc 26 (16 mm diameter, 500 microns thick) was used as the negative electrode, and the electrolyte 24 was 1M LiPF$_6$ in EC:EMC (Soulbrain MI, Northville Township, MI, USA), 3:7 by weight (where EC is Ethylene Carbonate and EMC is Ethyl Methyl Carbonate). "Anode" half-cells were built with a lithium-ion battery anode (e.g., graphite-based materials) as the positive electrode 100. Cathode half-cells were built with the lithium-ion battery cathode (e.g., NMC-based materials) as the positive electrode. The lithium-ion battery cathodes were 15.6 mm in diameter. The separator 22 for the anode half-cells was glass fiber filter paper (WHATMAN®, grade GF/F; available from MilliporeSigma, Burlington, MA, USA). The separator 22 for the cathode half-cells was a trilayer membrane of polypropylene/polyethylene/polyproylene (CELGARD® 2320; Cellgard LLC, Charlotte, NC, USA). The separators 22 were 19 mm in diameter.

The 2032 hardware was obtained from Shenzhen TICO Technology Co., Ltd., Shenzhen, China (note that a grommet was integrated on the negative can 16 to seal the cell and electrically isolate the two terminals once the cell is crimped). The cathode half-cell hardware was made of 316 stainless steel, and the anode half-cell hardware was made of 304 stainless steel. An exploded diagram of the half-cell components is shown in FIG. 1. The spacer 20 for the anode half-cells was 304 Stainless Steel, 1 mm thick and 16 mm in diameter. The spacer 20 for the cathode half-cell was 316 Stainless Steel 1 mm thick and 16 mm in diameter. The conical spring 18 for the anode half-cell was 304 Stainless Steel, described by the manufacturer as "15.4×1.1 for 20 series battery". The conical spring 18 for the cathode half-cell was 316 Stainless Steel, described by the manufacturer as "15.4×1.1 for 20 series battery".

All cells (i.e., the half cells described above) were assembled in an argon-filled glove box. The lithium discs 26, electrolyte 24, and CELGARD® 2320 were stored in the argon glove box to minimize moisture content. Prior to cell assembly, the cell hardware (positive can 14, negative can 16, spacer 20, and conical spring 18), lithium-ion electrode 100, 200, and glass fiber filter paper were dried overnight at 80° C. under vacuum. When assembling cells, the following steps were followed:

a) Brushed both surfaces of 16 mm lithium disc 26 with stainless steel brush
b) Placed lithium disc 26 in negative can 16
c) Added 150 μL of electrolyte 24 to negative can 16
d) Aligned 19 mm separator 22 over negative can 16 (note separator diameter is larger than negative can diameter)
e) Aligned positive electrode 100 on separator 22 (active material side down if a metal foil was present), centered over negative can 16
f) Aligned 1.0 mm spacer 20 on positive electrode 100 g) Pressed separator 22, positive electrode 100, and spacer 20 down into negative can 16 (separator edge wraps up around the electrode 100, 200 and spacer 20, preventing shorting at separator edges)

h) Placed conical spring 18 on top of spacer 20, with wide opening toward spacer 20 i) Placed positive can 14 on top, crimped to 7,500-9,000 kPa, cleaned residual electrolyte 24 from cell surfaces j) Placed half-cells 10 into an oven (at ambient pressure in an air environment) at 45° C. for 16 hours to facilitate electrolyte wetting Full cells can be assembled similarly to cathode half-cells, (i.e., the cell hardware is 316 stainless steel, the separator is Celgard trilayer, and a lithium-ion anode is used in place of the lithium disc). Optionally, the negative electrode can be slightly larger diameter than the cathode to prevent edge artifacts. Like cathode half-cells, full cells are in the discharged state once assembled.

Example 7

Anode Half-Cell Testing

All half-cells were charged and discharged using a Neware battery cycler (CT-4008T-5V50 mA-164-U Three Range Battery Testing Equipment; Neware Battery Testers Int., Belleville, IL, USA). Note that anode half-cells were in a charged state once assembled, therefore one cycle is counted as a discharge followed by a charge. The voltage range for the anode half-cells was 0.01 V to 1.5 V. Anode half-cells were discharged (corresponding to lithiation of the positive electrode) in CCCV (Constant Current-Constant Voltage) mode (i.e., the cell was discharged at constant current until the lower voltage limit was reached, and was then discharged at constant voltage until the current tapered to a C/20 rate), and charged in CC (Constant Current) mode (i.e., the cell was charged at constant current until the upper voltage limit was reached). The charge and discharge capacity were reported in units of mAh/g, where the mass refers to the amount of active material (e.g., SLC1520T graphite for anode half cells). For the first cycle constant current portions of discharge and charge were performed at a nominal rate of C/20. The current required for a nominal rate of 1C was determined by assuming 355 mA/g, where the mass refers to the mass of the active material (e.g., SLC1520T graphite). To calculate the initial capacity loss, the first discharge capacity was subtracted from the first charge capacity, and the difference was divided by the first discharge capacity. The discharge/charge C-rates for the initial formation and power testing of the half-cells are shown in Table 7. After cycle 25, another 49 cycles were carried out in the same manner at 0.2C discharge (lithiation) and 0.5C charge (delithiation) to evaluate capacity fade. The discharge/charge capacity and energy were determined for each cycle, along with the area series resistance. In addition, to compare to the half-cell data, an ex-situ measurement was made of the through-plane electrical resistance of the positive electrode. Table 8 shows the first discharge capacity, first charge capacity, and initial capacity loss for "control" lithium-ion anode samples (i.e., anodes prepared according to Example 4). Table 9 shows the first discharge capacity, first charge capacity, and initial capacity loss for inventive lithium-ion anode samples of the present disclosure (i.e., anodes prepared according to Example 2).

TABLE 7

Discharge/Charge C-rates for Formation
and Power Testing of Anode Half-Cells

| Cycle# | Lithiation Nominal C-Rate (Discharge, CCCV mode) | Delithiation Nominal C-Rate (Charge, CC mode) |
|---|---|---|
| 1 | 0.05 | 0.05 |
| 2 | 0.1 | 0.1 |
| 3 | 0.1 | 0.1 |
| 4 | 0.1 | 0.1 |
| 5 | 0.2 | 0.5 |
| 6 | 0.2 | 0.5 |
| 7 | 0.2 | 0.5 |
| 8 | 0.2 | 0.2 |
| 9 | 0.2 | 1 |
| 10 | 0.2 | 1 |
| 11 | 0.2 | 1 |
| 12 | 0.2 | 0.2 |
| 13 | 0.2 | 2 |
| 14 | 0.2 | 2 |
| 15 | 0.2 | 2 |
| 16 | 0.2 | 0.2 |
| 17 | 0.2 | 3 |
| 18 | 0.2 | 3 |
| 19 | 0.2 | 3 |
| 20 | 0.2 | 0.2 |
| 21 | 0.2 | 0.5 |
| 22 | 0.2 | 0.5 |
| 23 | 0.2 | 0.5 |
| 24 | 0.2 | 0.2 |
| 25 | 0.2 | 0.5 |

TABLE 8

Initial Capacity of Control Lithium-Ion
Battery Anodes Tested in Anode Half-Cells

| Composite Sheet Sample | First Active Material Lithiation (Discharge) Capacity mAh/g | First Active Material Delithiation (Charge) Capacity mAh/g | Initial Capacity Loss (ICL) % |
|---|---|---|---|
| Sample 9A | 9 | 364 | 344 | −6% |
| Sample 9B | 9 | 366 | 346 | −6% |
| Sample 9C | 9 | 367 | 346 | −6% |
| Sample 9D | 9 | 356 | 340 | −4% |
| Sample 9E | 9 | 365 | 345 | −5% |

TABLE 9

Initial Capacity of Lithium-Ion Battery
Anodes Tested in Anode Half-Cells

| Composite Sheet Sample | First Active Material Lithiation (Discharge) Capacity mAh/g | First Active Material Delithiation (Charge) Capacity mAh/g | Initial Capacity Loss (ICL) % |
|---|---|---|---|
| Sample 2A | 2 | 377 | 328 | −13% |
| Sample 2B | 2 | 377 | 327 | −13% |
| Sample 2C | 2 | 375 | 326 | −13% |
| Sample 2D | 2 | 375 | 325 | −13% |
| Sample 2E | 2 | 366 | 316 | −14% |
| Sample 3A | 3 | 363 | 308 | −15% |
| Sample 3B | 3 | 357 | 303 | −15% |
| Sample 3C | 3 | 362 | 305 | −16% |
| Sample 3D | 3 | 366 | 310 | −15% |
| Sample 3E | 3 | 363 | 307 | −15% |
| Sample 4A | 4 | 358 | 306 | −15% |
| Sample 4B | 4 | 364 | 310 | −15% |
| Sample 4C | 4 | 366 | 312 | −15% |

TABLE 9-continued

| | Initial Capacity of Lithium-Ion Battery Anodes Tested in Anode Half-Cells | | |
|---|---|---|---|
| Composite Sheet Sample | First Active Material Lithiation (Discharge) Capacity mAh/g | First Active Material Delithiation (Charge) Capacity mAh/g | Initial Capacity Loss (ICL) % |
| Sample 4D | 4 | 359 | 308 | −14% |
| Sample 4E | 4 | 362 | 308 | −15% |

Example 8

Cathode Half-Cell Testing

All half-cells were charged and discharged using a Neware battery cycler (CT-4008T-5V50 mA-164-U Three Range Battery Testing Equipment). Cathode half-cells were in the discharged state once assembled, so one cycle was counted as a charge followed by a discharge. The voltage range for the cathode half-cells was from 3.0 V to 4.3 V. Cathode half-cells were charged (corresponding to delithiation of the positive electrode) in CCCV (Constant Current-Constant Voltage) mode (i.e., the cell was charged at constant current until the upper voltage limit was reached, and then was charged at constant voltage until the current tapered to a C/20 rate), and discharged in CC (Constant Current) mode (i.e., the cell was discharged at constant current until the lower voltage limit was reached). The charge and discharge capacity is reported in units of mAh/g, where the mass refers to the amount of active material (e.g., NMC-111 from MSE Supplies, LLC. for cathode half cells). For the first e constant current portions of charge and discharge were performed at a nominal rate of C/20. The current required for a nominal rate of 1C was determined by assuming 155 mA/g, where the mass refers to the mass of the active material (e.g., NMC-111). To calculate the initial capacity loss, the first charge capacity was subtracted from the first discharge capacity, and the difference was divided by the first charge capacity. The charge/discharge C-rates for the initial formation and power testing of the half cells are shown in Table 10. The first charge capacity, first discharge capacity, and initial capacity loss are shown in Table 11 for "control" lithium-ion cathode samples (i.e., cathodes prepared according to Example 5). Table 12 shows the first charge capacity, first discharge capacity, and initial capacity loss for inventive lithium-ion cathode samples of the present disclosure (i.e., cathodes prepared according to Example 3). After cycle 25, another 49 cycles were carried out in the same manner at 0.2C charge (delithiation) and 0.5C discharge (lithiation) to evaluate capacity fade. The discharge/charge capacity and energy were determined for each cycle, along with the area series resistance. In addition. To compare to the half-cell data, an ex-situ measurement was made of the through-plane electrical resistance of the positive electrode. Full lithium-ion cells (or "full cells") can be tested using the same protocols as cathode half-cells. The current density corresponding to a rate of 1C is determined based on the cathode electrode the same way it is in a cathode half-cell.

TABLE 10

| | Charge/Discharge C-Rates for Formation and Power Testing of Cathode Half-Cells | |
|---|---|---|
| Cycle# | Delithiation Nominal C-Rate (Charge, CCCV mode) | Lithiation Nominal C-Rate (Discharge, CC mode) |
| 1 | 0.05 | 0.05 |
| 2 | 0.1 | 0.1 |
| 3 | 0.1 | 0.1 |
| 4 | 0.1 | 0.1 |
| 5 | 0.2 | 0.5 |
| 6 | 0.2 | 0.5 |
| 7 | 0.2 | 0.5 |
| 8 | 0.2 | 0.2 |
| 9 | 0.2 | 1 |
| 10 | 0.2 | 1 |
| 11 | 0.2 | 1 |
| 12 | 0.2 | 0.2 |
| 13 | 0.2 | 2 |
| 14 | 0.2 | 2 |
| 15 | 0.2 | 2 |
| 16 | 0.2 | 0.2 |
| 17 | 0.2 | 3 |
| 18 | 0.2 | 3 |
| 19 | 0.2 | 3 |
| 20 | 0.2 | 0.2 |
| 21 | 0.2 | 0.5 |
| 22 | 0.2 | 0.5 |
| 23 | 0.2 | 0.5 |
| 24 | 0.2 | 0.2 |
| 25 | 0.2 | 0.5 |

TABLE 11

| | | Initial Capacity of Control Lithium-Ion Battery Cathodes Tested in Cathode Half-Cells | | |
|---|---|---|---|---|
| Sample | Composite Sheet Sample | First Active Material Lithiation (Discharge) Capacity mAh/g | First Active Material Delithiation (Charge) Capacity mAh/g | Initial Capacity Loss (ICL) % |
| Sample 10A | 10 | 152 | 166 | −8% |
| Sample 10B | 10 | 152 | 166 | −8% |
| Sample 10C | 10 | 152 | 166 | −9% |
| Sample 10D | 10 | 152 | 166 | −8% |

TABLE 12

| | | Initial Capacity of Cathodes - Each Cathode Prepared From the Same Sheet | | |
|---|---|---|---|---|
| Sample | Composite Sheet Sample | First Active Material Lithiation (Discharge) Capacity mAh/g | First Active Material Delithiation (Charge) Capacity mAh/g | Initial Capacity Loss (ICL) % |
| Sample 8A | 8 | 155 | 168 | −8% |
| Sample 8B | 8 | 151 | 165 | −8% |

TABLE 12-continued

Initial Capacity of Cathodes - Each
Cathode Prepared From the Same Sheet

| Sample | Composite Sheet Sample | First Active Material Lithiation (Discharge) Capacity mAh/g | First Active Material Delithiation (Charge) Capacity mAh/g | Initial Capacity Loss (ICL) % |
|---|---|---|---|---|
| Sample 8C | 8 | 155 | 168 | −8% |
| Sample 8D | 8 | 152 | 167 | −9% |
| Sample 8E | 8 | 153 | 167 | −8% |

Example 9

Figure 5:
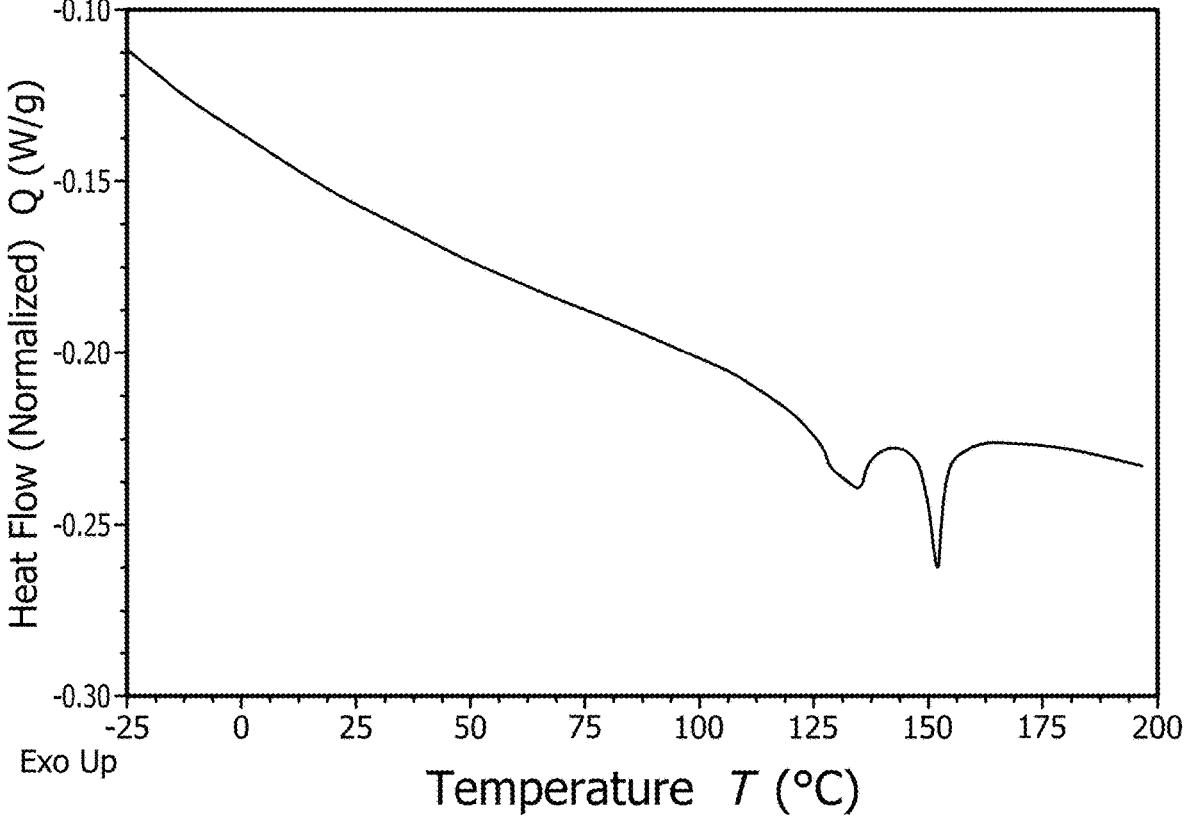
FIG. 5 is a differential scanning calorimetry (DSC) thermogram of conditioned UHMWPE particles in accordance with embodiments described herein.

DSC Scans of UHMWPE Resin Used in Examples 1 and 2
    DSC thermograms of Resin A used to prepare Sample 1
in Example 1, and DSC thermograms of the Conditioned Resin A used to prepare Samples 2-7 in Example 2, are shown in FIG. 5.

Example 10

Higher Mass Fraction Filler (Lower Binder Content)
    Three composite blends were prepared in the manner taught in Example 2 with varying compositions. The compositions included:
    1) a composite blend of 95.99 wt % graphite (Superior Graphite, supra). 1.51 wt % carbon black (Imerys S.A., supra), and 2.5 wt % Resin A Conditioned;
    2) a composite blend of 96.48 wt % graphite (Superior Graphite, supra), 1.52 wt % carbon black (Imerys S.A., supra), and 2.0 w (% Resin A conditioned; and
    3) a composite blend of 96.97 wt % graphite (Superior Graphite, supra), 1.53 wt % carbon black (Imerys S.A., supra), and 1.50 wt % Resin A conditioned. The results from the above three composite blends are shown in Table 13.

TABLE 13

Summary Table of Composite Sheet Properties with Low Polyethylene Content

| Sample | Polyethylene amount, wt % | thickness, micron | Mass per area, g/m2 | Max stress MD, kPa | Max strain MD at max load, % | Max strain MD at breaking % |
|---|---|---|---|---|---|---|
| 1 | 2.5 | 176 | 279.5 | 1288 | 0.26 | 0.46 |
| 2 | 2.0 | 180 | 293.5 | 882 | 0.18 | 0.35 |
| 3 | 1.5 | 178 | 283.5 | 293 | 0.03 | 0.22 |

Example 11

Forming Electrode Directly on Metal Foil
    Lithium-ion battery anodes were produced with Resin A Conditioned and copper foil (thickness: 10 micron). The foil was dropped between the rolls and along one side of the roll. Composite blends of 95.15 wt % graphite (Superior Graphite, supra), 1.5 wt % carbon black (Imerys S.A., supra), and 3.35 wt % polyethylene Resin A conditioned was fed on the roll and the foil together, and laminated electrode was processed directly. An electrode with anode composite integrated on copper foil was obtained. The thickness was 220 microns and mass per area was 528 g/m$^2$.
    Lithium-ion battery cathode was produced with Resin A conditioned and aluminum foil (thickness: 15 micron). The foil was dropped between the rolls and along one side of the roll. A composite blend of 94.3 wt % Lithium Nickel Manganese Cobalt Oxide NMC-111 (Li$_{1.05}$Ni$_{0.33}$Mn$_{0.33}$Co$_{0.33}$O$_2$; commercially available from MSE Supplies LLC, Tucson AZ), 1.5 wt % carbon black (Imerys S.A., supra; C65), 2.5 wt % graphite (Imerys S.A., supra; SFG6-L), 1.6 wt % polyethylene Resin A Conditioned was fed on the roll and the foil together, and laminated electrode was processed directly. An electrode with cathode composite integrated on aluminum foil was obtained. The film thickness was 200 microns and mass per area was 704 g/m$^2$. These samples were measured for compression electrical resistance. For comparison, anode and cathode electrode samples adhered to the foils with adhesive were also measured for a compressed electrical resistance. Table 14 provides the compressed electric resistivity. The compressed resistance measurement measures electric resistance in the direction of thickness when 30 kg of pressure is applied through 2 cm$^2$ circular terminals. To stabilize the measurement, the value measured a second time, and that was the value used.

TABLE 14

Summary of Electrode Prepared by Forming Directly on Metal Foil

| Sample type | Electrode type | Metal foil | Thickness, um | Mass per area, g/m2 | Compressed electric resistance: pressure 30 kg Resistivity | Unit |
|---|---|---|---|---|---|---|
| Forming electrode layer directly on the foil | Anode | Copper | 220 | 528.1 | 45.2 | mohm · cm2 |
| Adhesive adheres foil to electrode layer | Anode | Copper | 178 | 352.1 | 24.2 | mohm · cm2 |
| Forming electrode layer directly on the foil | Cathode | Aluminum | 200 | 704.2 | 4.9 | ohm · cm2 |
| Electrodes adhered to metal foil with adhesive | Cathode | Aluminum | 189 | 508.3 | 37.6 | ohm · cm2 |

Comparative Example 3

Comparative Example for Conditioning of Resins

Additional composite electrodes were prepared using different UHMWPE binders from what was described in Example 2. For the comparative polyethylene composites, a composite blend of 95.15 wt % graphite (Superior Graphite, supra), 1.5 wt % carbon black (Imerys S.A., supra), and 3.35 wt % Resin B and for PTFE composites, a composite blend of 91.27 wt % graphite (Superior Graphite, supra), 1.44 wt % carbon black (Imerys S.A., supra), and 7.30 wt % PTFE was utilized. Composite electrode samples were prepared using Resin A, Resin B, and PTFE in the stated compositions. Additionally, composite samples were prepared using Resin A Conditioned, Resin B Conditioned, and PTFE Conditioned. A total of six composite sheets was produced. The data is set forth in Table 15.

TABLE 15

Composite Sheet Properties with Other Binders

| Sample | Binder | Resin median Da, micron | thickness, micron | Mass per area, g/m2 | Max stress MD, kPa | Max strain at max load, % | Max strain at break % |
|---|---|---|---|---|---|---|---|
| 1 | Resin A | 309.1 | 255.0 | 328.0 | 126.9 | 0.77 | 0.97 |
| 2 | Resin A conditioned | 28.4 | 169.0 | 271.6 | 3215.1 | 1.97 | 2.33 |
| 3 | Resin B | 8.6 | 197.0 | 301.8 | 1023.2 | 0.54 | 1.52 |
| 4 | Resin B conditioned | 7.9 | 161.5 | 255.2 | 479.4 | 0.76 | 0.82 |
| 5 | PTFE | 347.6 | 149.0 | 279 | 1305.2 | 38.82 | 41.37 |
| 6 | PTFE conditioned | 96.95 | 160 | 301.73 | 1128.2 | 40.38 | 43.21 |

Example 12

Anode Produced with Alternative Active Material

Anode samples were prepared according to the procedure described in Example 2 set forth above. After conditioning the UHMWPE resin, a composite blend of 95.15 wt % graphite (Nippon Graphite, CGB-6R), 1.5 wt % carbon black (Imerys S.A., supra), and 3.35 wt % Resin A Conditioned was used to create a composite with a thickness of 175 microns and a mass per area of 322.5 g/m². The composite functioned as an electrode.

Example 13

Cathode Produced with Alternative Active Material

Additional cathode samples were prepared according to the procedure described in Example 3 above. After conditioning Resin A, a composite blend of 94.3 wt % Lithium Cobalt Oxide LiCoO₂ (Cellseed C-5H, Nihon Kagaku), 1.5 wt % carbon black (Imerys S.A., supra; C65), 2.5 wt % graphite (Imerys S.A., supra; SFG6-L), 1.6 wt % Resin A conditioned was used to create a composite with a thickness of 170 microns and a mass per area of 567.6 g/m². The composite functioned as an electrode.

Example 14

Powder Rheology Testing for UHMWPE Resins

Powder rheology testing was performed on multiple UHMWPE resins, including: Resin A, Resin A conditioned, Resin B, and Resin B conditioned. Data Tables 16-18 show changes in properties of the resins using FT4 powder rheometer's compressibility test, dynamic test, and shear test, respectively. Table 16 shows values of bulk density and compressibility measured in compressibility test of powder rheometer. The data also show % change in bulk density and compressibility % after conditioning the Resin A and Resin B. Table 17 shows results of dynamic testing and % change in Basic Flow Energy (BFE) and Specific Energy (SE) after conditioning Resin A and Resin B. Table 18 shows results of shear testing including % change in cohesion, unconfined yield stress (UYS), and Angle of Internal Friction (AIF) for polyethylene resins. The data in table also shows % change in properties like cohesion, unconfined yield stress, and angle of internal friction after conditioning Resin A and Resin B.

When Resin A was conditioned to Resin A Conditioned 1 and Resin A Conditioned 2, a significant change in bulk density was observed. As shown in Table 16, 43.88% and 52.24% increase in bulk density was observed when Resin A was conditioned into to Resin A Conditioned 1 and Resin A Conditioned 2, respectively. However, when Resin B was conditioned, only 1.38% increase in bulk density (g/cc) was observed. When Resin A was conditioned to Resin A Conditioned 1, 48.43% increase in compressibility (%) of the resin was observed. When Resin A was conditioned to Resin A Conditioned 2, 47.29% increase in compressibility (%) of the resin was observed. When Resin B was conditioned, a 21.25% increase in compressibility (%) was observed.

Conditioned Resin B. The % increase in cohesion value for Resin A was 3.68 when conditioned into Resin A Conditioned 1. The % increase in cohesion value for Resin A was 2.02 when conditioned into Resin A Conditioned 2. However, when Resin B was conditioned into Resin B Conditioned, the cohesion value decreased by 19.84%. UYS values for Resin A increased by 66.62% and 59.63% when conditioned into Resin A Conditioned 1 and Resin A Conditioned 2, respectively. UYS value for Resin B increased by 22.30% when conditioned into Resin B Conditioned. AIF values for conditioned Resin A increased by 202.23% and 192.06% when conditioned into Resin A Conditioned 1 and Resin A Conditioned 2, respectively. However, the AIF value for Resin B decreased by 5.12% when Resin B was conditioned into Resin B Conditioned.

TABLE 16

Freeman FT4 Powder Rheology Compressibility
Test of Polyethylene Powder Resins

| Material | Bulk Density (g/cc) | Compressibility % at 15 kPa Normal Stress | % Change in Bulk Density compared to neat resin | % Change in Compressibility compared to neat resin |
|---|---|---|---|---|
| Resin A | 0.067 | 35.10 | 0.00 | 0.00 |
| Resin A Conditioned 1 | 0.096 | 52.10 | 43.88 | 48.43 |
| Resin A Conditioned 2 | 0.102 | 51.70 | 52.24 | 47.29 |
| Resin B | 0.434 | 15.6 | 0.00 | 0.00 |
| Resin B Conditioned | 0.440 | 18.9 | 1.38 | 21.15 |

Table 17 shows powder rheology dynamic testing results for Resin A and Resin B as well as conditioned Resin A and Conditioned Resin B. As shown in the data Table 17, BFE values for Resin A were increased 56.06% and 34.18% after conditioning into Resin A Conditioned 1 and Resin A Conditioned 2, respectively. However, when Resin B was conditioned, BFE value decreased by 6.67%. Resin A also showed a significant increase in SE values after conditioning; 158.85% increase after conditioning into Resin A Conditioned 1 and 154.71% increase after conditioning into Resin A Conditioned 2. Resin B showed a very small % increase of 1.94% after conditioning into Resin B Conditioned.

Table 18 shows powder rheology shear testing data for Resin A and Resin B as well as conditioned Resin A and

TABLE 17

Freeman FT4 Powder Rheology Dynamic
Test of Polyethylene Powder Resins

| Material | BFE, mJ | SE, mJ/g | % Change in BFE compared to neat resin | % Change in SE compared to neat resin |
|---|---|---|---|---|
| Resin A | 110.90 | 3.56 | 0.00 | 0.00 |
| Resin A Conditioned 1 | 173.07 | 9.22 | 56.06 | 158.85 |
| Resin A Conditioned 2 | 148.80 | 9.07 | 34.18 | 154.71 |
| Resin B | 525.00 | 10.3 | 0.00 | 0.00 |
| Resin B Conditioned | 490.00 | 10.5 | −6.67 | 1.94 |

TABLE 18

Freeman FT4 Powder Rheology Shear Test of Polyethylene Powder Resin

| Material and Batch | Cohesion, kPa | UYS, kPa | AIF, ° | % Change in Cohesion, kPa | % Change in UYS, kPa | % Change in AIF, ° |
|---|---|---|---|---|---|---|
| Resin A | 5.44 | 13.45 | 12.09 | 0.00 | 0.00 | 0.00 |
| Resin A Conditioned 1 | 5.64 | 22.41 | 36.54 | 3.68 | 66.62 | 202.23 |
| Resin A Conditioned 2 | 5.55 | 21.47 | 35.31 | 2.02 | 59.63 | 192.06 |
| Resin B | 2.62 | 8.97 | 29.3 | 0.00 | 0.00 | 0.00 |
| Resin B Conditioned | 2.10 | 6.97 | 27.8 | −19.84 | 22.30 | −5.12 |

Example 15

Capillary Rheology Data

UHMWPE resin as well as mixtures of filler and UHMWPE as set forth in Table 19 were tested in a capillary rheometer as described in Test Method set forth above. Table 19 shows the results of the capillary rheometer testing. All the experiments were performed at 130° C. die and barrel temperature.

TABLE 19

Capillary Rheometer Testing

| Resin Binder or Electrode Binder/Filler Mix | UHMWPE Binder | Filler | Force Slope (N/mm) | Extrudate Form/Comments |
|---|---|---|---|---|
| Resin Binder Only | Resin A | None | 102 | Solid Strong Extrudate |
| | Resin A conditioned | None | 93 | Solid Strong Extrudate |
| | Resin B | None | 375 | Solid Strong Extrudate |
| Anode Binder/Filler Mix | Resin A | Graphite 1 | 336 | Powder |
| | Resin A conditioned | Graphite 1 | 1192 | Solid Strong Extrudate |
| | Resin A conditioned | Graphite 1 | 1044 | Solid Strong Extrudate |
| | Resin B | Graphite 1 | 366 | Weak flakes |
| | Resin A conditioned | Graphite 2 | 73.28 | Weak flakes |
| | Resin A conditioned | Graphite 3 | 24.73 | Powder |
| Cathode Binder/Filler Mix | Resin A | Lithium Nickel Manganese Cobalt Oxide | 2185 | Solid Weak Extrudate |

TABLE 19-continued

Capillary Rheometer Testing

| Resin Binder or Electrode Binder/Filler Mix | UHMWPE Binder | Filler | Force Slope (N/mm) | Extrudate Form/Comments |
|---|---|---|---|---|
| | Resin A conditioned | Lithium Nickel Manganese Cobalt Oxide | 758 | Solid Extrudate |
| | Resin A conditioned | Lithium Iron Phosphate | 433 | Solid Weak Extrudate |

Example 16

Filler Binder Mixing

It was determined that better mixing and satisfactory (stronger in strength and more uniform) tape formation was achieved when powders with closer or more similar in particle sizes were used as compared to powders that were less similar in particle size. When Resin A particles with a median particle size of 314 microns was mixed with a median particle size of 14 microns of filler particle the tape formation was not satisfactory. Using Resin A Conditioned to sizes of 36 microns or 28 microns, tape formation with 14-micron filler particle was satisfactory. Closer particles sizes of UHMWPE resin and filler particles resulted in stronger tape formation. Table 20 shows the various particle sizes of binder UHMWPE and filler particles in each composition. The ratio of UHMWPE particle size and filler particle size closer to 1 was preferred to obtain optimal mixing. Table 20 also shows shape parameters in terms of length to width ratio (L/W) for resin and filler particles.

TABLE 20

Area Equivalent Diameter Median Da of UHMWPE Resin, Conditioned UHMWPE Resin, and Filler Particles

| Binder Type | Filler | UHMWPE Binder Particle Size Median Da, microns | Filler Particle Size Median Da, microns | Ratio of PE particle size and filler particle size | Binder Shape (Length to Width Ratio) | Filler Shape (Length to Width Ratio) | Ratio of Binder Median (L/W) and Filler Median (L/W) |
|---|---|---|---|---|---|---|---|
| Resin A | Graphite 1 | 314.78 | 14.39 | 21.87 | 1.576 | 1.438 | 1.096 |
| Resin A Conditioned | Graphite 1 | 36.45 | 14.39 | 2.53 | 1.603 | 1.438 | 1.115 |

TABLE 20-continued

Area Equivalent Diameter Median Da of UHMWPE Resin,
Conditioned UHMWPE Resin, and Filler Particles

| Binder Type | Filler | UHMWPE Binder Particle Size Median Da, microns | Filler Particle Size Median Da, microns | Ratio of PE particle size and filler particle size | Binder Shape (Length to Width Ratio) | Filler Shape (Length to Width Ratio) | Ratio of Binder Median (L/W) and Filler Median (L/W) |
|---|---|---|---|---|---|---|---|
| Resin A Conditioned | Graphite 1 | 28.35 | 14.39 | 1.97 | 1.668 | 1.438 | 1.160 |
| Resin A | Graphite 2 | 314.78 | 14.75 | 21.34 | 1.576 | 1.513 | 1.041 |
| Resin A Conditioned | Graphite 2 | 36.45 | 14.75 | 2.47 | 1.603 | 1.513 | 1.059 |
| Resin A Conditioned | Graphite 2 | 28.35 | 14.75 | 1.92 | 1.668 | 1.513 | 1.102 |
| Resin A | Graphite 3 | 314.78 | 4.70 | 67.05 | 1.576 | 1.484 | 1.062 |
| Resin A Conditioned | Graphite 3 | 36.45 | 4.70 | 7.76 | 1.603 | 1.484 | 1.080 |
| Resin A Conditioned | Graphite 3 | 28.35 | 4.70 | 6.04 | 1.668 | 1.484 | 1.124 |
| Resin A | Graphite 4 | 314.78 | 10.82 | 29.10 | 1.576 | 1.556 | 1.013 |
| Resin A Conditioned | Graphite 4 | 36.45 | 10.82 | 3.37 | 1.603 | 1.556 | 1.030 |
| Resin A Conditioned | Graphite 4 | 28.35 | 10.82 | 2.62 | 1.668 | 1.556 | 1.072 |
| Resin A | Graphite 5 | 314.78 | 5.11 | 61.62 | 1.576 | 1.536 | 1.026 |
| Resin A Conditioned | Graphite 5 | 36.45 | 5.11 | 7.14 | 1.603 | 1.536 | 1.044 |
| Resin A Conditioned | Graphite 5 | 28.35 | 5.11 | 5.55 | 1.668 | 1.536 | 1.086 |
| Resin A | Lithium nickel manganese cobalt oxide | 314.78 | 6.45 | 48.79 | 1.576 | 1.473 | 1.070 |
| Resin A Conditioned | Lithium nickel manganese cobalt oxide | 36.45 | 6.45 | 5.65 | 1.603 | 1.473 | 1.088 |
| Resin A Conditioned | Lithium nickel manganese cobalt oxide | 28.35 | 6.45 | 4.39 | 1.668 | 1.473 | 1.132 |
| Resin A | Lithium iron phosphate | 314.78 | 5.12 | 61.52 | 1.576 | 1.447 | 1.089 |
| Resin A Conditioned | Lithium iron phosphate | 36.45 | 5.12 | 7.12 | 1.603 | 1.447 | 1.108 |
| Resin A Conditioned | Lithium iron phosphate | 28.35 | 5.12 | 5.54 | 1.668 | 1.447 | 1.153 |

Example 16

Adhesive for Foil and Bonding of Electrode to Foil

A conductive adhesive material was prepared to adhere the free-standing electrode to metal foil. As conductive materials, high-purity artificial graphite with an average particle diameter: 8 microns (SP-270, Nippon Graphite Industries, Inc.) and acetylene black (Denka black by Denki Kagaku Kogyo Co) were used. Poly-N-vinyl acetamide (PNVA GE191-104, Showa Denko) was also used as a binder. These materials were mixed for material content; graphite:acetylene black:PNVA:water=3.5:3.5:54:39 wt %. As current collector, copper foil (thickness: 10 microns) was prepared for anode and aluminum foil (thickness: 15 microns) was prepared for cathode.

The conductive adhesive was coated to one side of the current collector foil using a brush. After coating, an electrode was laminated on the conductive adhesive coated side (i.e., one side) of the foil and passed through a compression roll to make a laminated sheet. The laminated electrode was heated in a continuous hot air dryer set at a temperature of 100° C. for 10 minutes to remove the dispersant from the conductive adhesive. A laminated electrode was obtained.

Example 17

Conditioning of Resin A

A composite blend of 95.15 wt % graphite (commercially available from Superior Graphite, Chicago, Illinois, USA), 1.5 wt % carbon black (commercially available from Imerys S.A., Bironica, Switzerland), and 3.35 wt % Resin A was blended by the method described in Example 1. Sample 1 used Resin A and Samples 2, 3 and 4 used three different conditioned Resin A's. Table 21 sets forth properties of Resin A that was used to prepare Samples 1-4, and properties of the composite sheet Samples 1-4. Table 22 provides DSC peak integration data for Samples 1 to 4.

TABLE 21

Summary table of UHMWPE properties and composite sheet properties

| | UHMWPE Properties | | | | Composite Sheet Properties | | |
| Sample | Median Da, microns | Median Sphericity (scale 0 to 1) | Median Convexity (Scale 0 to 1) | Median L/W Ratio | Tensile stress at max load, kPa | Tensile strain at max load, % | Tensile strain at break, % |
|---|---|---|---|---|---|---|---|
| 1 | 309.1 | 0.81 | 0.93 | 1.67 | 126.9 | 0.77 | 0.97 |
| 2 | 36.45 | 0.86 | 0.991 | 1.603 | 1010.1 | 2.28 | 2.86 |
| 3 | 28.35 | 0.76 | 0.981 | 1.668 | 3215.1 | 1.97 | 2.33 |
| 4 | 19.94 | 0.867 | 0.985 | 1.688 | 5165.4 | 3.51 | 3.91 |

TABLE 22

DSC Peak Integration For Composite Sheets

| Sample | Total Area (J/g) 100° C. to 175° C. | Partial Area 1 (J/g) 100° C. to 143° C. | Partial Area 2 (J/g) 143° C. to 175° C. | Normalized Partial Area 1 (% of total area) 100° C. to 143° C. as percentage of 100° C. to 175° C. | Normalized Partial Area 2 (% of total area) 143° C. to 175° C. as percentage of 100° C. to 175° C. |
|---|---|---|---|---|---|
| 1 | 4.366 | 3.316 | 1.05 | 76 | 24 |
| 2 | 3.97 | 2.835 | 1.135 | 71 | 29 |
| 3 | 3.997 | 2.468 | 1.529 | 62 | 38 |
| 4 | 3.716 | 2.319 | 1.397 | 62 | 38 |

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A blended particle composition comprising:

filler particles; and fibrillatable ultra-high molecular weight polyethylene (UHMWPE) particles, wherein the UHMWPE particles are used as a binder, the UHMWPE particles having:

a molecular weight of at least about 2,000,000 g/mol, a bulk density from about 0.04 g/ml to about 0.25 g/ml, and a melt enthalpy of at least 190 J/g, wherein the UHMWPE particles are formed of agglomerations of fine particles having an average diameter greater than or equal to 10 nm and less than or equal to 2000 nm, and wherein the blended particle composition contains therein about 1% by weight to about 10% by weight of the UHMWPE binder particles.

2. The blended particle composition of claim 1, wherein the blended particle composition contains therein about 1% by weight to about 5% by weight of the UHMWPE binder particles.

3. The blended particle composition of claim 1, wherein the filler particles include filler material comprising at least one of carbon particles, conductive carbon particles, activated carbon particles, graphite particles, carbon black particles, and lithium compound particles.

4. The blended particle composition of claim 1, wherein the UHMWPE particles also have a percent (%) compressibility of at least 20% at 15 kPA normal stress as measured using powder rheometer at 22° C.

5. The blended particle composition of claim 4, wherein the UHMWPE particles also have cohesion of at least 3 kPa as measured using a powder rheometer at 22° C.

6. The blended particle composition of claim 4, wherein the UHMWPE particles also have unconfined yield stress (UYS) of at least 10 kPA as measured using a powder rheometer at 22° C.

7. The blended particle composition of claim 4, wherein the UHMWPE particles also have an angle of internal friction (AIF) of at least 25° as measured using a powder rheometer at 22° C.

* * * * *